US012561045B2

(12) United States Patent
Mehta et al.

(10) Patent No.: US 12,561,045 B2
(45) Date of Patent: Feb. 24, 2026

(54) CONTENT-BASED MENUS FOR TABBED USER INTERFACE

(71) Applicant: Microsoft Technology Licensing, LLC, Redmond, WA (US)

(72) Inventors: Pooja Mehta, Redmond, WA (US); Chad Rothschiller, Edmonds, WA (US); Steven Oliver Lengieza, Seattle, WA (US); Daniel Vincent Fiordalis, Seattle, WA (US); Jose Luis Teran, Seattle, WA (US); Laurentiu Titi Nedelcu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 158 days.

(21) Appl. No.: 18/147,340

(22) Filed: Dec. 28, 2022

(65) Prior Publication Data

US 2024/0220074 A1     Jul. 4, 2024

(51) Int. Cl.
*G06F 3/0482* (2013.01)
*G06F 3/04812* (2022.01)
*G06F 16/955* (2019.01)

(52) U.S. Cl.
CPC ........ *G06F 3/0482* (2013.01); *G06F 3/04812* (2013.01); *G06F 16/955* (2019.01)

(58) Field of Classification Search
CPC ... G06F 3/0482; G06F 3/04812; G06F 16/955
See application file for complete search history.

(56) References Cited

U.S. PATENT DOCUMENTS

| | | | |
|---|---|---|---|
| 10,535,005 B1 * | 1/2020 | Badr ..................... | G06F 3/0482 |
| 11,762,537 B1 * | 9/2023 | Rothschiller ....... | G06F 3/04812 |
| | | | 715/764 |
| 2006/0184537 A1 | 8/2006 | Sauve et al. | |
| 2009/0313536 A1 * | 12/2009 | Karidi ................... | G06F 16/972 |
| | | | 715/209 |
| 2012/0131441 A1 * | 5/2012 | Jitkoff ................ | G06Q 30/0641 |
| | | | 715/234 |
| 2013/0125005 A1 * | 5/2013 | French ................ | G06F 16/9577 |
| | | | 715/738 |

(Continued)

OTHER PUBLICATIONS

Invitation to pay additional search fee Received in PCT Application No. PCT/US23/036064, mailed on Feb. 6, 2023, 10 pages.
(Continued)

*Primary Examiner* — Andrew T Chiusano
(74) *Attorney, Agent, or Firm* — NovoTechIP International PLLC

(57) ABSTRACT

A data processing system implements displaying a tabbed user interface comprising a plurality of tabs for navigating among a plurality of electronic content items and detecting a user input indicating a selection of a first tab of the plurality of tabs. The first tab is associated with a first electronic content item of the plurality of electronic content items. The system further implements obtaining tab menu content for a tab menu based on a subject matter of the first electronic content item, generating one or more menu items based on the tab menu content, and causing the tab menu to be displayed proximate to the first tab, the tab menu including the one or more menu items.

20 Claims, 21 Drawing Sheets

(56)                    References Cited

U.S. PATENT DOCUMENTS

| | | | | |
|---|---|---|---|---|
| 2013/0167156 | A1* | 6/2013 | Ressler | G06F 9/542 |
| | | | | 719/318 |
| 2014/0053107 | A1* | 2/2014 | Patel | G06F 3/0482 |
| | | | | 715/840 |
| 2015/0195179 | A1* | 7/2015 | Skare | G06F 3/0482 |
| | | | | 715/779 |
| 2015/0199436 | A1* | 7/2015 | Bailey | G06F 16/9535 |
| | | | | 707/708 |
| 2018/0307390 | A1* | 10/2018 | Fang | G06F 9/44 |
| 2019/0384657 | A1* | 12/2019 | Chen | G06F 9/451 |
| 2021/0365521 | A1* | 11/2021 | Yusuf | G06F 3/04855 |
| 2023/0418891 | A1* | 12/2023 | Andrew | G06F 9/445 |
| 2024/0184604 | A1* | 6/2024 | Yim | G06F 3/0482 |

OTHER PUBLICATIONS

International Search Report and Written Opinion received for PCT Application No. PCT/US23/036064, mailed on Mar. 27, 2024, 19 pages.
International Preliminary Report on Patentability received for PCT Application No. PCT/US2023/036064, Jul. 10, 2025, 12 pages.

\* cited by examiner

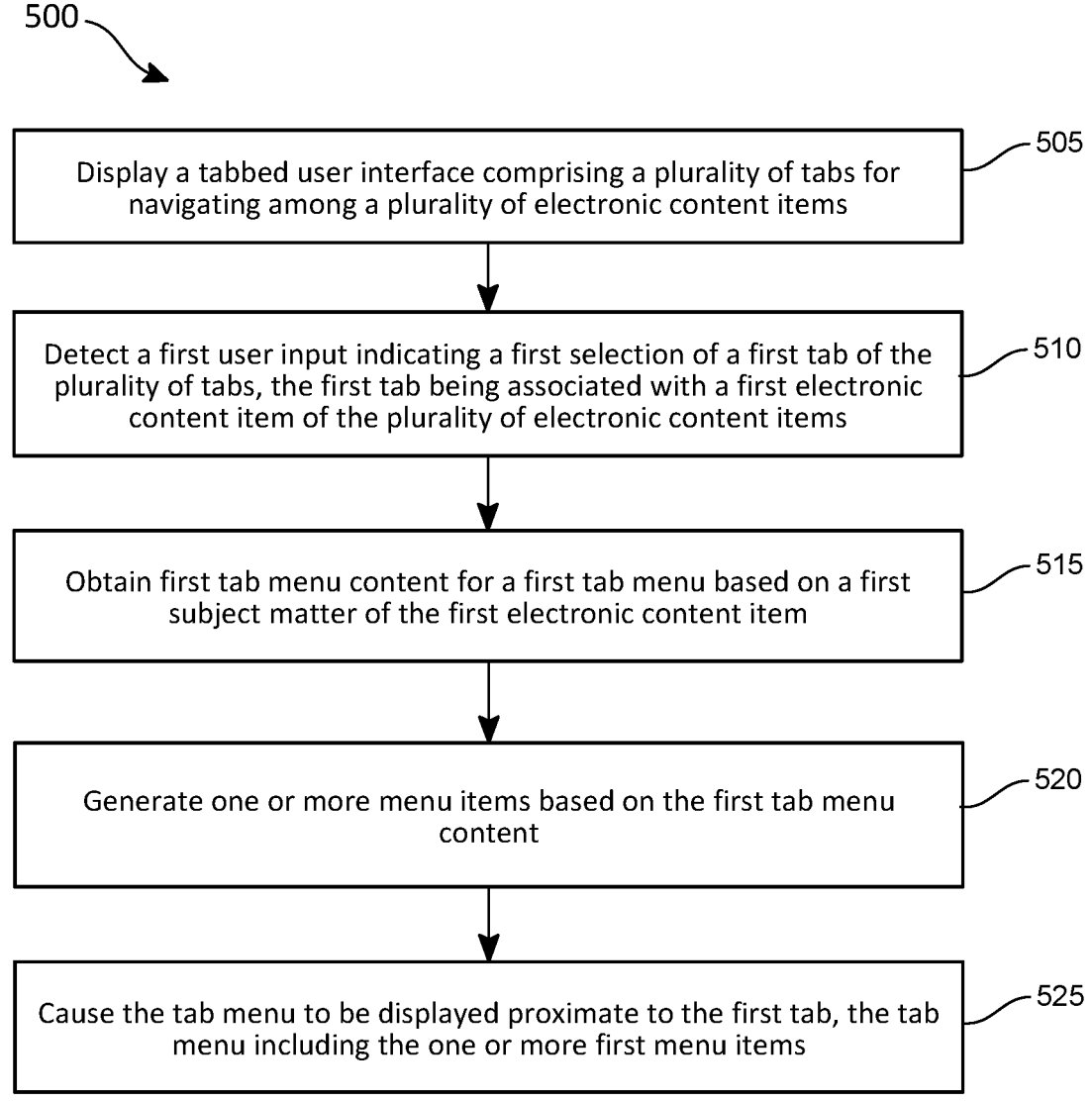

500

505
Display a tabbed user interface comprising a plurality of tabs for navigating among a plurality of electronic content items 510
Detect a first user input indicating a first selection of a first tab of the plurality of tabs, the first tab being associated with a first electronic content item of the plurality of electronic content items 515
Obtain first tab menu content for a first tab menu based on a first subject matter of the first electronic content item 520
Generate one or more menu items based on the first tab menu content 525
Cause the tab menu to be displayed proximate to the first tab, the tab menu including the one or more first menu items

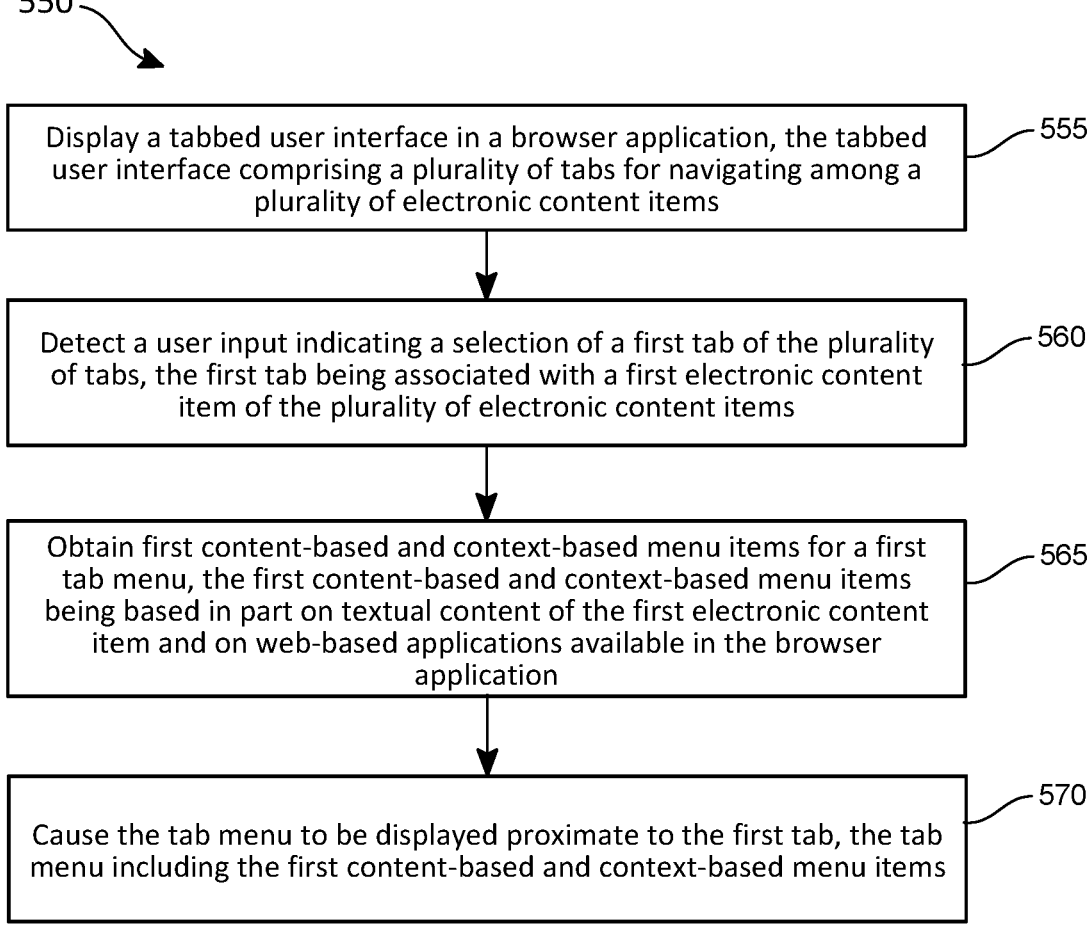

Display a tabbed user interface in a browser application, the tabbed user interface comprising a plurality of tabs for navigating among a plurality of electronic content items — 555

Detect a user input indicating a selection of a first tab of the plurality of tabs, the first tab being associated with a first electronic content item of the plurality of electronic content items — 560

Obtain first content-based and context-based menu items for a first tab menu, the first content-based and context-based menu items being based in part on textual content of the first electronic content item and on web-based applications available in the browser application — 565

Cause the tab menu to be displayed proximate to the first tab, the tab menu including the first content-based and context-based menu items — 570

FIG. 5B

CONTENT-BASED MENUS FOR TABBED USER INTERFACE

BACKGROUND

A tabbed user interface enables a user to have multiple documents, web pages, web applications, and/or other types of electronic content items open in a browser application. The flexibility provided by a tabbed interface often leads to users opening a multitude of tabs. However, the user must often navigate away from a tab and/or open another tab in order to access tools and/or applications to perform various actions, such as but not limited to sharing content with another user, searching for related content, and creating content related to the content being viewed in the tab. This approach can quickly become confusing as the user must navigate away from a tab to locate a tool to perform a desired action, thereby reducing efficiency and impacting the user experience. Hence, there is a need for improved systems and methods for enabling users to perform various actions without navigating away from the current tab to access tools to perform these actions.

SUMMARY

An example data processing system according to the disclosure may include a processor and a machine-readable medium storing executable instructions. The instructions when executed cause the processor to perform operations including displaying a tabbed user interface including a plurality of tabs for navigating among a plurality of electronic content items; detecting a first user input indicating a first selection of a first tab of the plurality of tabs, the first tab being associated with a first electronic content item of the plurality of electronic content items; obtaining first tab menu content for a first tab menu based on a first subject matter of the first electronic content item; generating one or more first menu items based on the first tab menu content; and causing the first tab menu to be displayed proximate to the first tab, the first tab menu including the one or more first menu items.

An example method implemented in a data processing system for providing a tabbed user interface includes displaying a tabbed user interface comprising a plurality of tabs for navigating among a plurality of electronic content items; detecting a user input indicating a selection of a first tab of the plurality of tabs, the first tab being associated with a first electronic content item of the plurality of electronic content items; obtaining tab menu content for a tab menu based on a subject matter of the first electronic content item; generating one or more menu items based on the tab menu content; and causing the tab menu to be displayed proximate to the first tab, the tab menu including the one or more menu items.

An example data processing system according to the disclosure may include a processor and a machine-readable medium storing executable instructions. The instructions when executed cause the processor to perform operations including displaying a tabbed user interface in a browser application, the tabbed user interface comprising a plurality of tabs for navigating among a plurality of electronic content items; detecting a first user input indicating a first selection of a first tab of the plurality of tabs, the first tab being associated with a first electronic content item of the plurality of electronic content items; obtaining first content-based and context-based menu items for a first tab menu, the first content-based and context-based menu items being based in part on textual content of the first electronic content item and on web-based applications available in the browser application; and causing the first tab menu to be displayed proximate to the first tab, the first tab menu including the first content-based and context-based menu items.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 5A is an example flow chart of an example process for providing a tabbed user interface that may be implemented by the browser application or native application of the client device.

FIG. 5B is an example flow chart of an example process for providing a tabbed user interface that may be implemented by the browser application or native application of the client device.

DETAILED DESCRIPTION

Figure 1A:
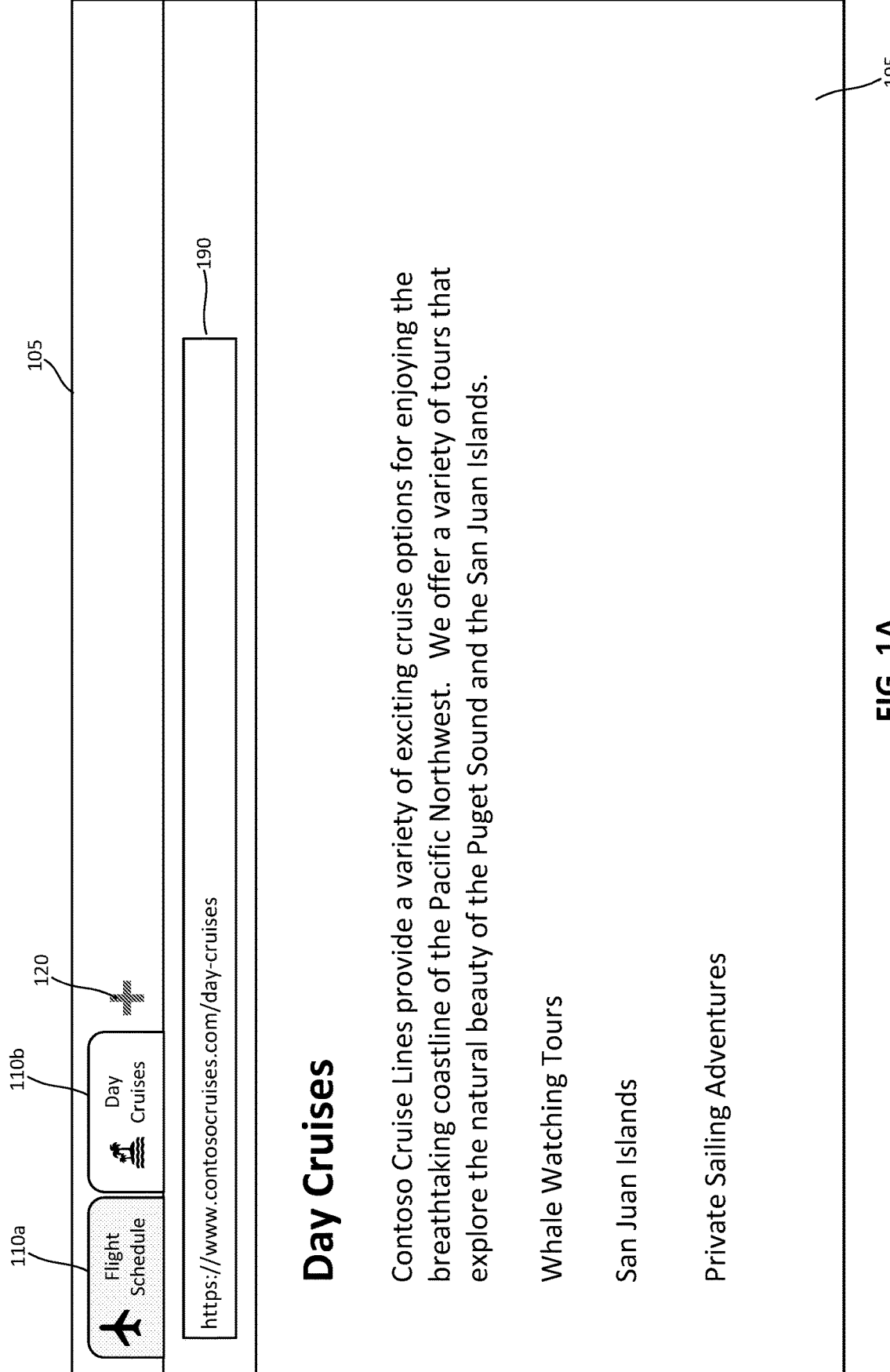
FIGS. 1A, 1B, 1C, 1D, 1E, 1F, and 1G are diagrams showing example user interfaces according to the techniques described herein.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Techniques for implementing a tabbed user interface are provided that, among other benefits, simplify navigating through such a tabbed user interface and improve user workflow. Users may become quickly overwhelmed when working with content in multiple tabs. The techniques herein provide tools for improving the user experience by providing tab-specific menus that provide tools and/or information to the user that is relevant to the tab on which the menu is provided. The tab-specific menus include menu items that are content-based and/or context-based. The tab-specific menu items are related to the content shown in a content pane of the tab on which the tab-specific menu is provided. The menu items are derived from and/or related to the content shown in the content pane of the tab. In some implementations, the menu items are generated by analyzing the content shown in the content pane of the tab using one or more natural language processing (NLP) models trained to analyze the content to determine a subject matter of the content and tab-specific menu items are generated based on this subject matter. In some implementations, the menu items include context-specific controls for web-based applications which are accessible to the user from a browser or web-enabled application in which the tabbed user interface is implemented. These controls can improve productivity and user workflow by placing tools in the tab-specific menu that enable the user to quickly access applications for sharing, creating, and/or consuming content that is relevant to the content of that particular tab.

No explicit actions are needed by the user to enable the content-based and/or context-based menu items of the tab-specific menus. The user does not need to install a browser extension or other software for providing the tab-specific menu functionality. Furthermore, the user does not need to explicitly take any actions, such as specifying the types of menu items to provide for specific types of content and/or specifying the types of menu items to provide based on the other applications and/or content that is accessible via the browser or web-enabled application.

These techniques may significantly improve the user experience by providing content-based and/or context-based menu items to the user on the tabs of the tabbed user interface. Furthermore, placing such controls on the tabs may help the user maintain their focus on a particular task and conserve the use of computer processing resources by reducing the number of clicks or other user inputs required to navigate the tabbed user interface and/or accomplish an associated task. These and other technical benefits of the techniques disclosed herein will be evident from the discussion of the example implementations that follow.

FIGS. 1A, 1B, 1C, 1D, 1E, 1F, and 1G are diagrams showing various implementations of an example user interface 105 according to the techniques described herein. FIG. 1A shows an example of a horizontal tabbed user interface 105 implemented according to the techniques described herein. The user interface 105 is implemented by a browser application or web-enabled native application of a client device in some implementations. The user interface 105 includes an address bar 190 for entering a Uniform Resource Locator (URL) for a document or web-based application and/or displaying the URL associated with content being displayed in a currently selected tab of the tabbed user interface 105. The tabs 110a and 110b in this example are each displaying web-based content, and tab 110b is the currently selected or "active" tab. The user interface 105 also includes a content pane 195 in which a first electronic content item associated with the active tab 110b is displayed. The electronic content item displayed by the tab may be a web page, a web application, a document, or other electronic content item available over a public and/or private network connection. In some implementations, at least a portion of the electronic content item(s) may be stored on a private network associated with an enterprise or other organization, and access to the content item(s) are limited to authorized users associated with the enterprise or other organization. The user interface 105 includes an add tab control 120 that is configured to cause a new tab to be added to the tabbed user interface 105 when the control is clicked on or otherwise activated.

Figure 1B:
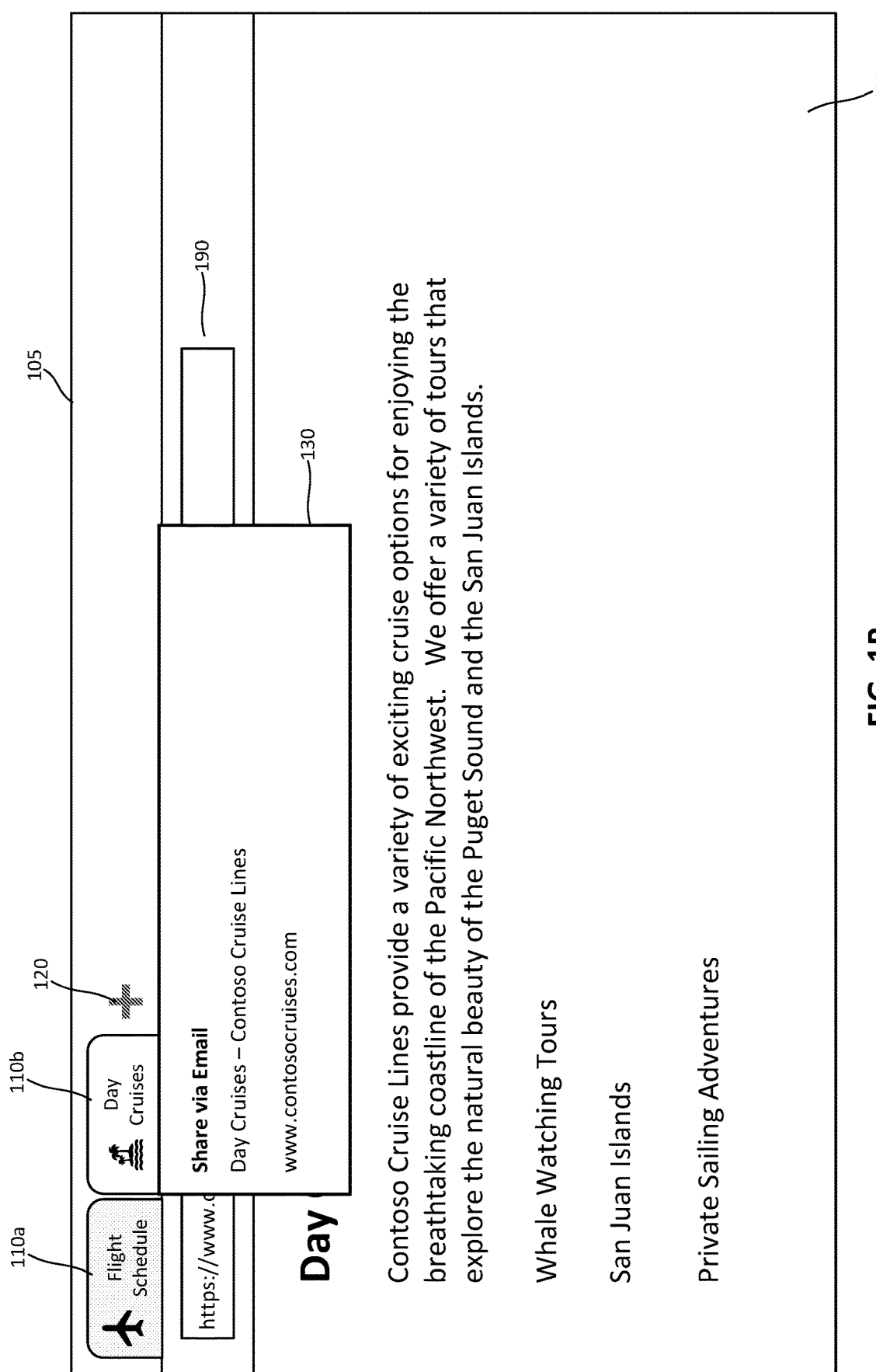

FIG. 1B is another example of the user interface 105 shown in FIG. 1A. In this example, the user interface 105 includes a tab menu 130. The tab menu 130 is displayed in response to the user clicking on, hovering a cursor or pointer over, touching the tab, issuing a verbal command that the tab should be selected, or otherwise interacting with the tab 110b of the tabbed user interface. The tab menu 130 presents the user with information and/or controls for interacting with the content shown in the content pane 195 and/or related content related. In the implementation shown in FIG. 1B, the tab menu 130 includes a single menu item, but other instances of the tab menu 130 may include multiple menu items. The information and/or controls presented in each of the menu items of the tab menu 130 is determined based on the content shown in the content pane 195 of the tab 110b. In this example, the user is viewing travel information in the content pane 195 of the tab 110b, and the menu 130 provides a control for sharing a summary of the content shown in the content pane 195 of tab 110b via an email. The examples that follow show how the contents of the tab menu 130 may be generated and how a user may interact with the tab menu 130 to improve the user workflow and experience. The examples that follow also show that the tab menu 130 for each tab may include different information and/or controls based on the content associated with that tab.

Figure 1C:
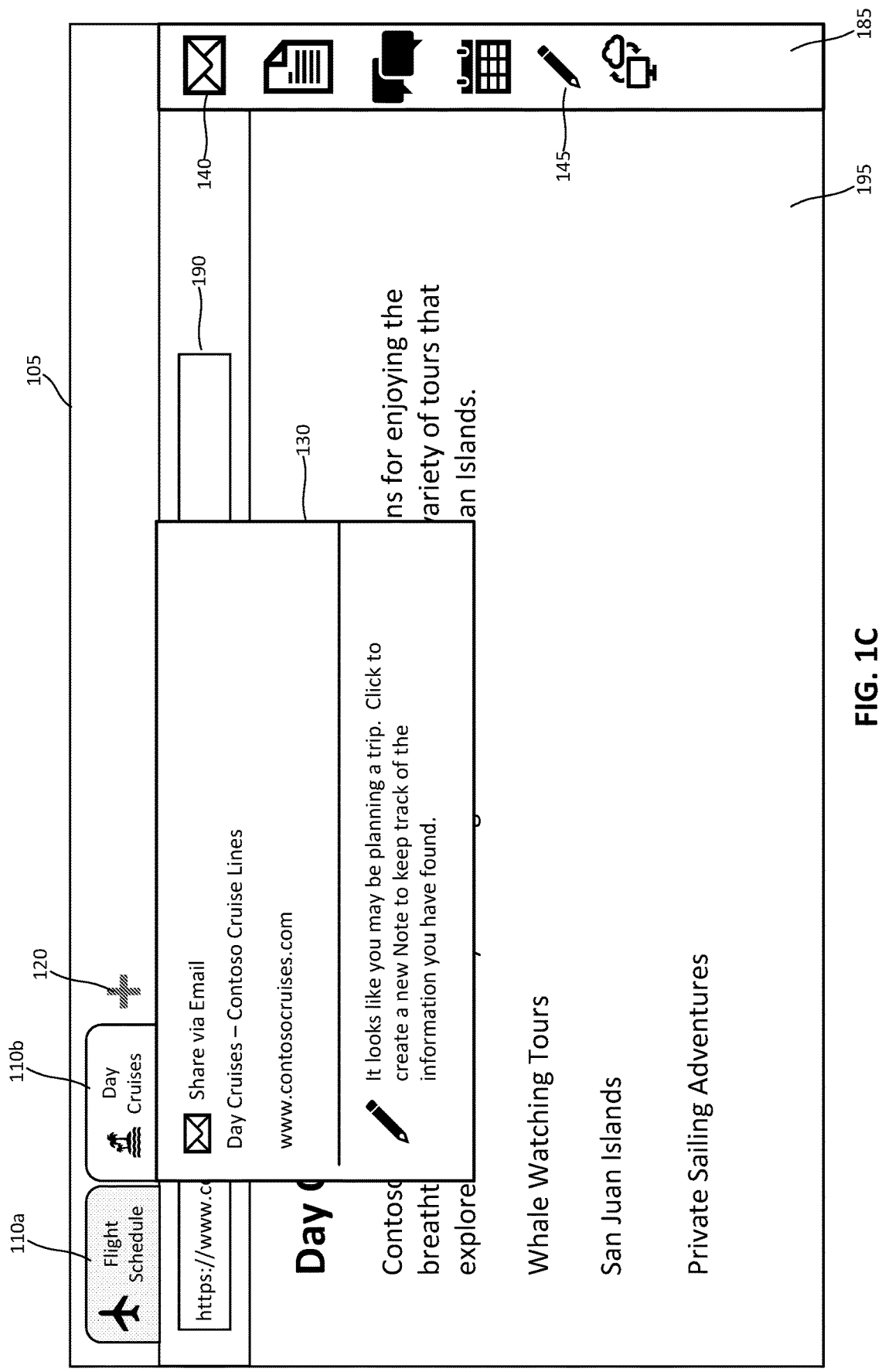

FIG. 1C is another example of the user interface 105 shown in FIGS. 1A and 1B. The example shown in FIG. 1C includes a navigation bar 185. In the example shown in FIG. 1C, the content of the tab menu 130 is both content-based and context-based. The tab menu 130 shown in FIG. 1C includes two menu items. Other implementations may include a different number of menu items based at least in part on the subject matter of the displayed content and context of that particular implementation. The content of the tab menu 130 is based in part on the content of the content pane 195 of the tab 110b, which is similar to the example shown in FIG. 1B. However, the content of the tab menu 130 shown in FIG. 1B is also based in part on the context of how the user typically interacts with the user interface 105 and/or how the user typically interacts utilizes various applications available to the user from the tabbed user interface. The user may have access to one or more applications that can be accessed via the tabbed user interface. These applications may be opened in a new tab in some implementations or overlaid over a tab in other implementations as discussed in detail in the examples which follow. The typical usage patterns of the user are taken into account as part of the context in some implementations. If the user typically accesses certain applications more frequently than others, the menu items presented to the user may be tailored toward the applications more commonly used by the user. Furthermore, if the user typically performs certain actions when viewing certain types of content in the content pane 195 of the active tab, the tab menu 130 may include menu items that enable the user to quickly perform these actions without having to navigate away from the active tab. Other usage patterns may be considered when determining the context in other implementations.

The menu items included in the tab menu 130 are associated with other applications and/or content that is accessible via the browser or web-enabled application in which the tabbed user interface 105 is being displayed. In the example shown in FIG. 1C, the navigation bar 185 includes icons representing a set of applications available to the user via the browser or web-enabled application. In some implementations, the browser application or web-enabled application is configured to determine which applications are available to the user on the navigation bar 185 and to provide menu items on the tab menu 130 that utilize one or more of the applications available to the user. In the example shown in FIG. 1C, the user has an email application 140 and a note taking application 145 available to the user, among other applications, and the tab menu 130 includes a first menu item for sharing the content of the content pane 195 of the tab with another user via email and a second menu item for creating a note file that includes a summary of the content being viewed in the content pane 195 of tab 110b. The particular applications may be selected from the available applications using various criteria. In some implementations, the applications that are selected are applications most commonly used by the user and/or which are likely to be relevant to the type of content being viewing the tab 110b. The examples which follow provide additional examples on how the content-based and context-based menu items are selected for inclusion in the menu tab 130.

Figure 1D:
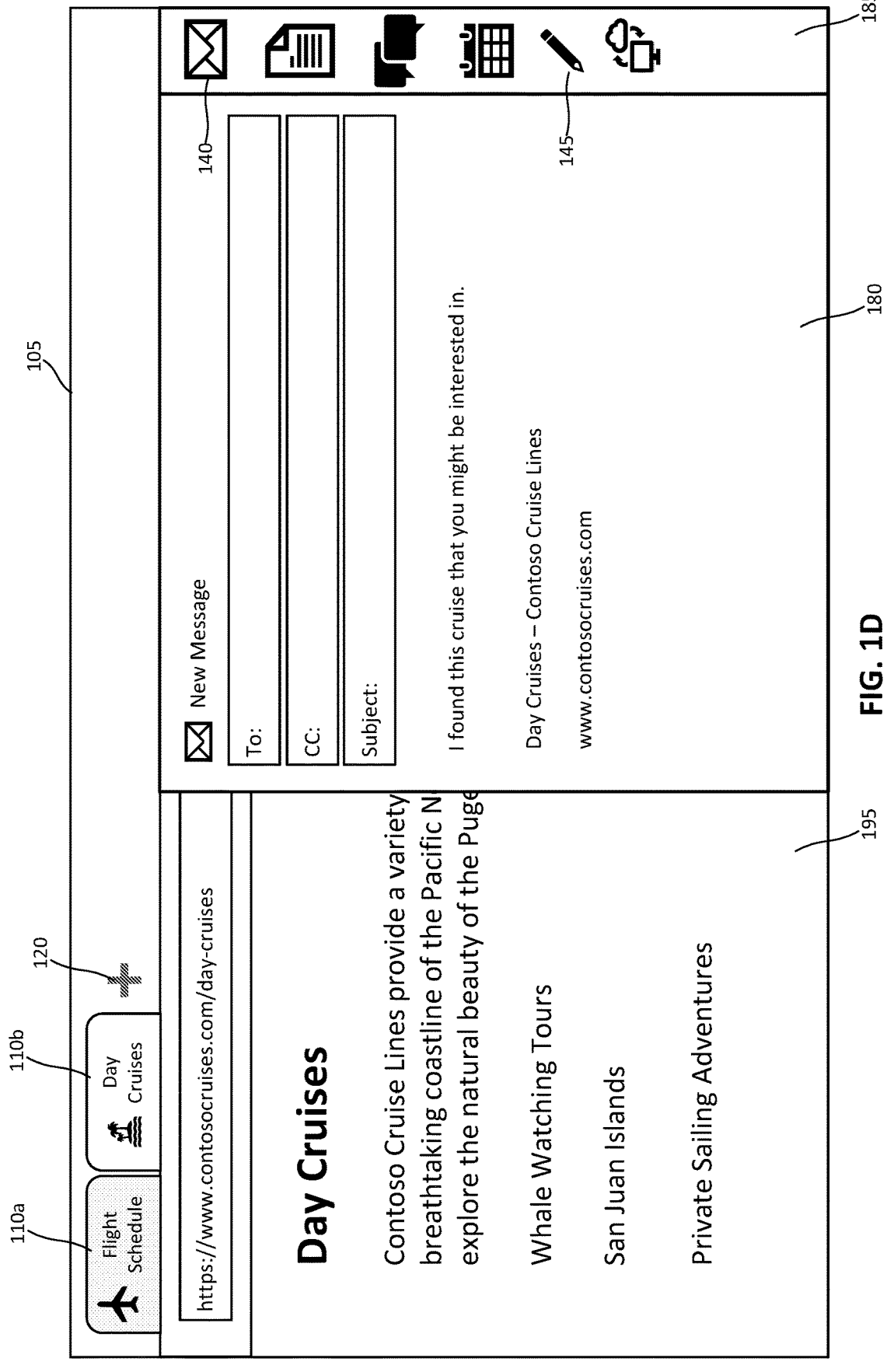

FIG. 1D is another example of the user interface 105 in which the user has selected the email option from the menu tab 130 shown in FIG. 1B or 1C. In response to the user selection, an application pane 180 is displayed that enables the user to compose an email message, e.g., to send a summary of and/or link to the content presented in the content pane 195 of the tab 110b to another user. The summary of the content presented in the content pane 195 of the tab 110b is automatically generated for the user in some implementations and inserted into the body of the email message. The user may edit this summary to suit their needs before sending the email message. In some implementations, other fields of the email message may also be populated. In a non-limiting example, the subject field of the email may be populated to provide the intended recipient or recipients of the email with information indicating what type of information is being shared with them. In another non-limiting example, the "to" field may be populated with the email address of one or more suggested recipients of the email message. The proposed recipients may be suggested based on contacts that the user most commonly contacts via email. The proposed recipients may also be based on the subject matter and recent activity in email, text messaging, social media, and/or other communication platforms in which the user has communicated with the proposed recipients regarding this subject matter. The example shown in FIG. 1D provides an example of one type of application that may be associated with the menu items. In other implementations, menu items of the tab menu 130 may be associated with other applications and selecting one of these menu items causes a content pane associated with that application to be presented on the user interface 105.

Figure 1E:
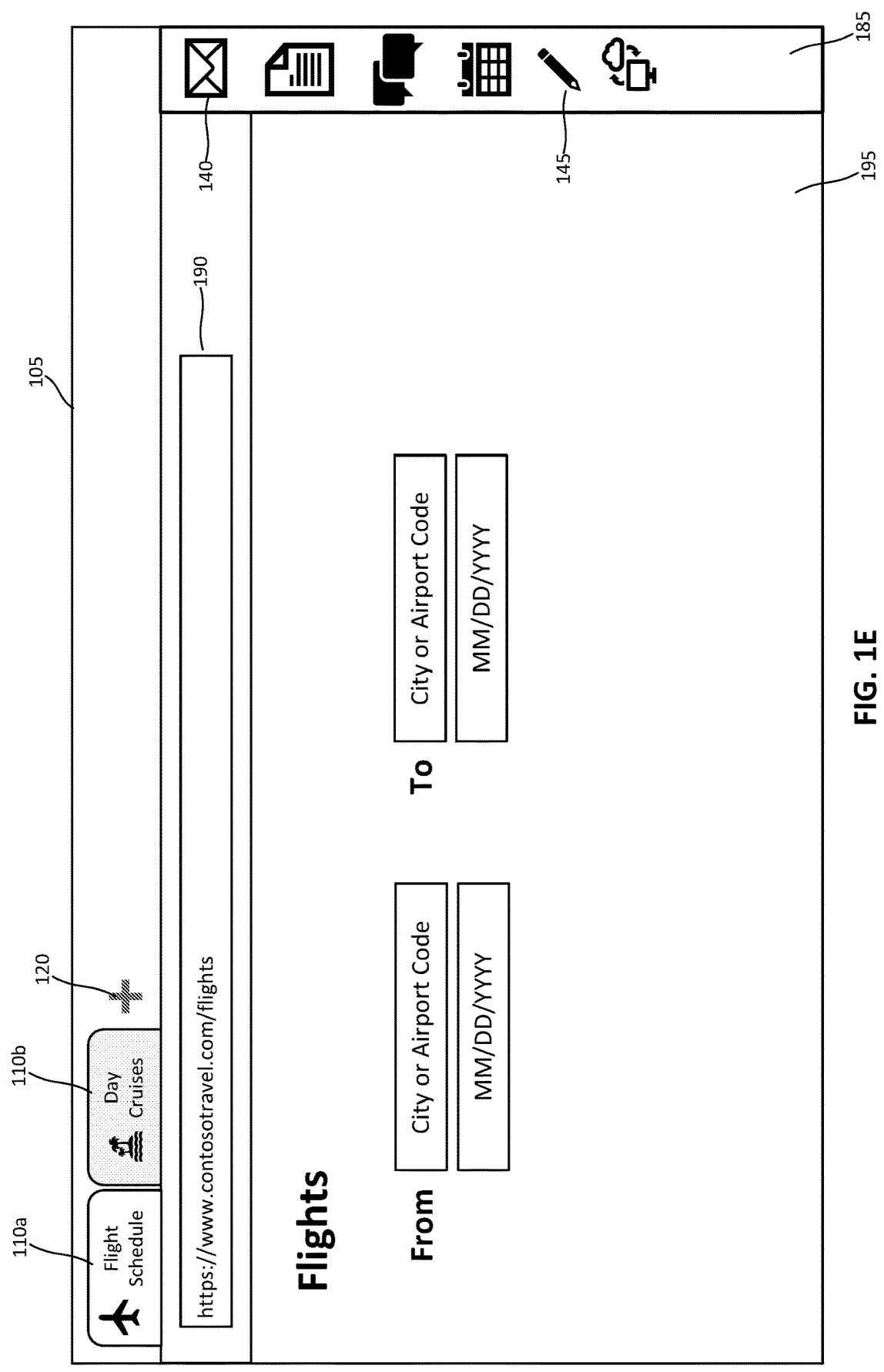
Figure 1F:
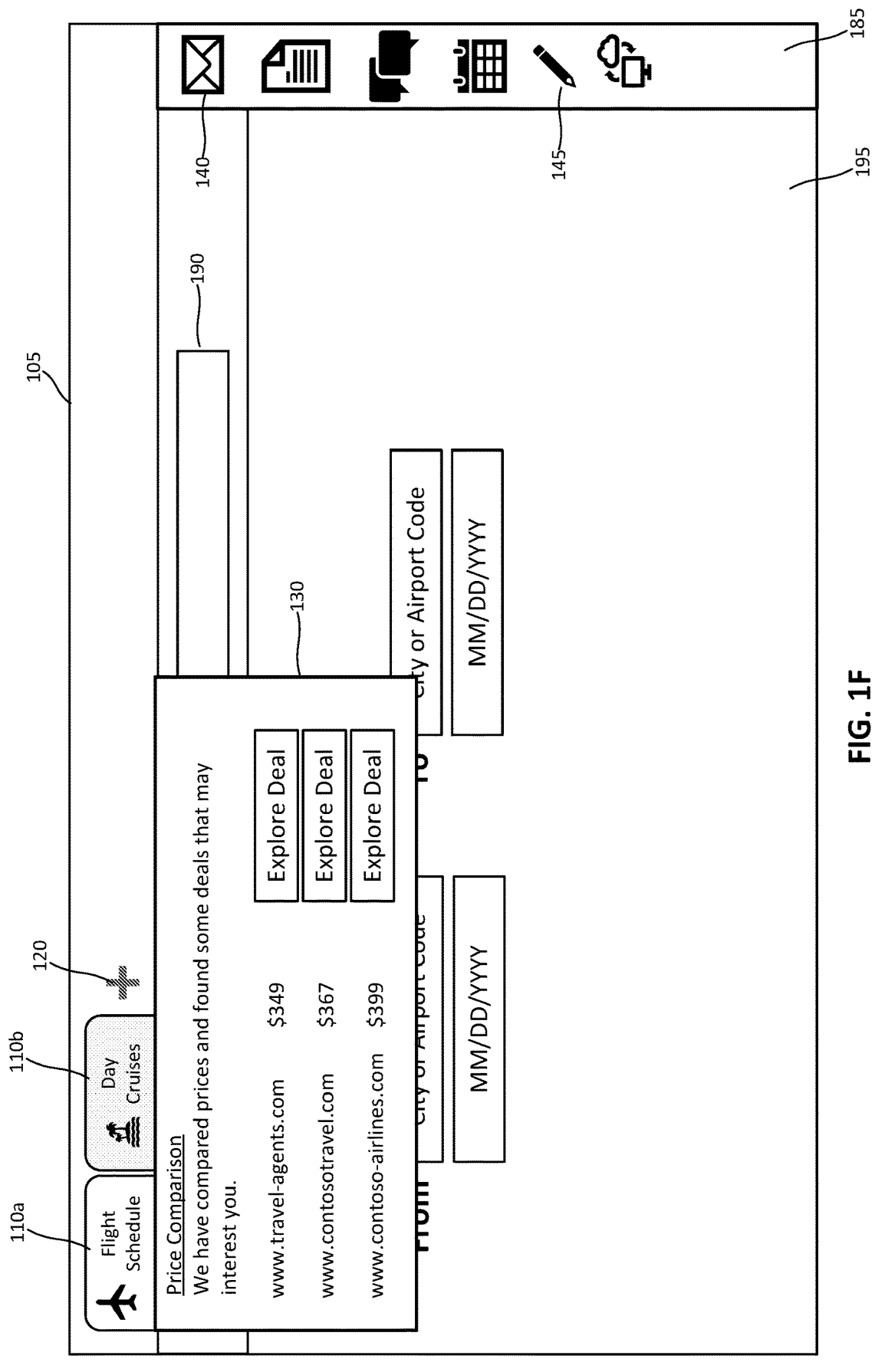
Figure 1G:
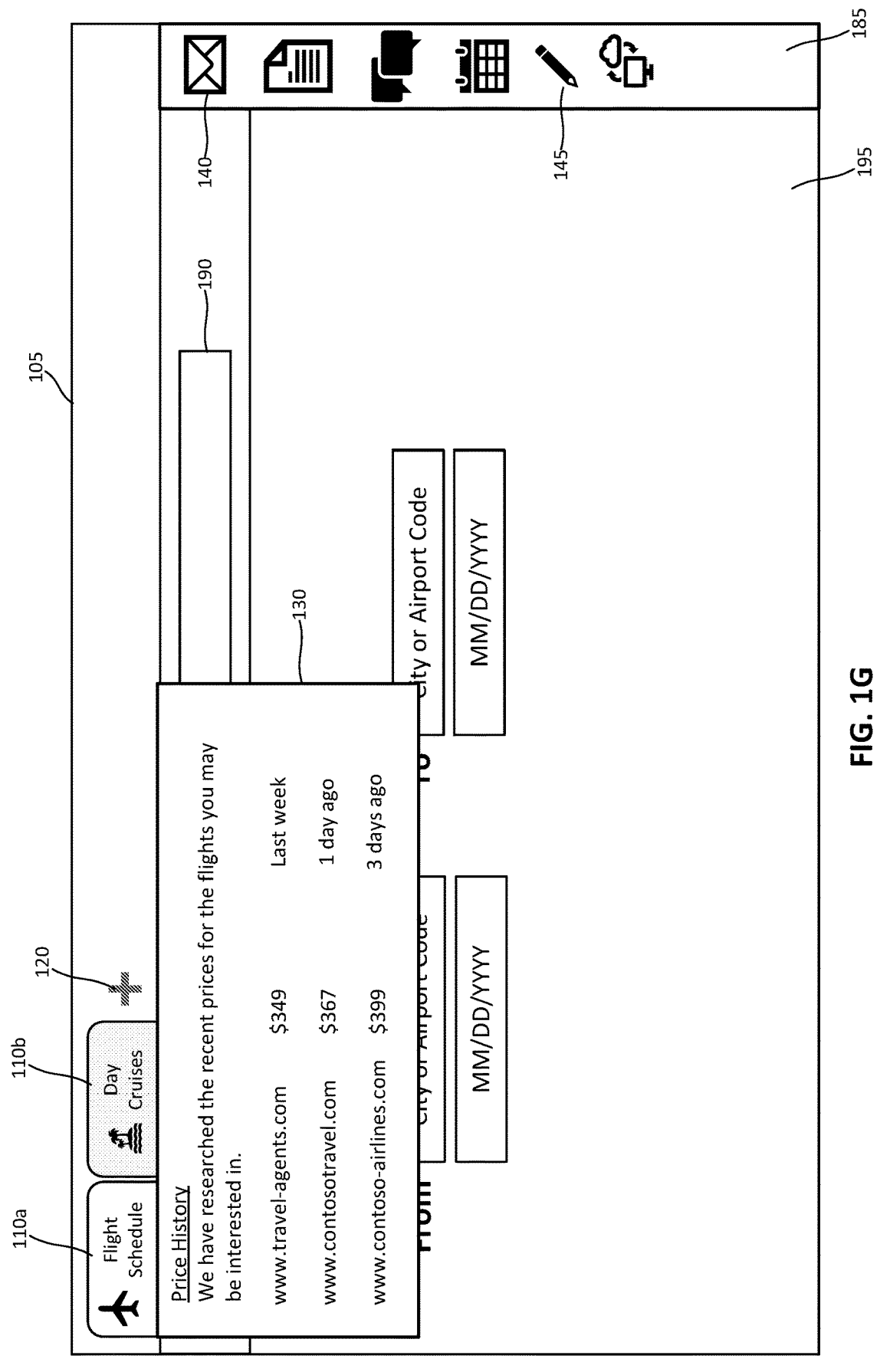

FIGS. 1E-1G show an example in which the user has selected the tab 110a. In these examples, the user is searching for flight information. FIG. 1E shows an example in which the user has selected the tab 110a and the content pane 195 shows the content associated with the tab 110a. FIG. 1F shows an example in which the tab menu 130 provides price comparison information to the user, and FIG. 1G shows an example in which the tab menu 130 provides price history information. In the example shown in FIG. 1F, the user may click on or otherwise activate the "Explore Deal" button associated with one of the price comparison entries to cause the user interface 105 to present the webpage or other source of the price information in a new tab. The content shown in the tab menu 130 shown in FIGS. 1F and 1G is generated based on the content shown in the content pane 195 of the tab 110a. The examples which follow show how the content of the tab menu 130 may be generated.

FIGS. 1A-1G provide examples of some of the types of information and/or controls that may be presented by the tab menu 130. The content that may be presented by the tab menu 130 is not limited to the specific examples shown in FIGS. 1A-1G. Furthermore, the content of the tab menu 130 may be combined in different combinations than those shown in FIGS. 1A-1G.

Figure 2:
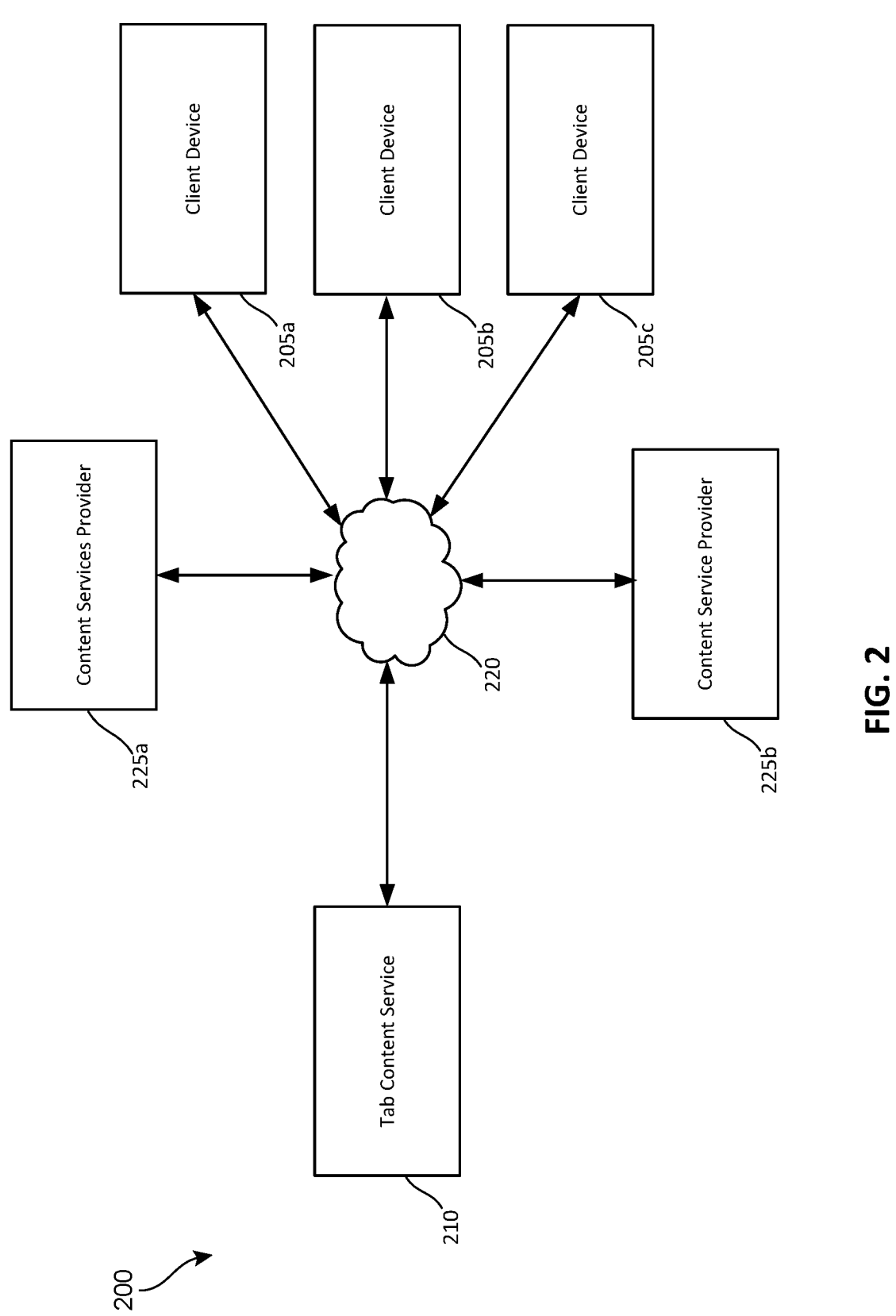
FIG. 2 is a diagram showing an example computing environment in which the techniques disclosed herein may be implemented.

FIG. 2 is a diagram showing an example computing environment 200 in which the techniques disclosed herein for providing an improved tabbed user interface may be implemented. The computing environment 200 may include a tab content service 210. The example computing environment 200 may also include client devices 205a, 205b, and 205c (collectively referred to as client device 205) and content service providers 225a and 225b (collected to referred to as content service provider 225). The client devices 205a, 205b, and 205c may communicate with the tab content service 210 and/or the content service provider 225 via the network 220. The network 220 may be a combination of one or more public and/or private networks and may be implemented at least in part by the Internet.

In the example shown in FIG. 2, the tab content service 210 is implemented as a cloud-based service or set of services. The tab content service 210 may be configured to receive a request for recommendations for content to be presented on the tab menu 130 of the tabbed user interface 105 of a browser application or other web-enabled native application on the client devices 205a, 205b, and 205c. The content may be derived from the contents of content pane of a tab displayed in the tabbed user interface on a client device 205. In some implementations, the tab content service 210 generates a summary or digest of a webpage or other electronic content being viewed, which may be provided to an application accessible from the web browser or web-enabled application similar to the example shown in FIG. 1D. In some implementations, the tab content service 210 generates other types of information associated with the electronic content being viewed in a tab of the tabbed user interface 105. Some examples of such information include but are not limited to, pricing history and/or price comparisons for products or services, product comparisons, review information for products or services, suggestions for sources of related information, and/or other types of information that may be relevant based on the content being viewed in the tab of the tabbed user interface. Other types of information may also be provided in other implementations. The content provided by the tab content service 210 may be requested by the browser application or other web-enabled native application of the client device 205. The browser application or other web-enabled native application may be used to access web-based content available from various sources, including but not limited to the content service providers 225a and 225b.

The content service providers 225a and 225b provide cloud-based software and services that are accessible to users via the client devices 205a, 205b, and 205c. The content service providers 225a and 225b provide web-based content that can be accessed from the browser application or web-enabled native application on the client device 205. In some implementations, the content service providers 225a and 225b provide various types of applications, such as but not limited to a communications platform, a collaboration platform, a word processing application, a presentation design application, and/or other types of applications.

The client devices 205a, 205b, and 205c are each a computing device that may be implemented as a portable electronic device, such as a mobile phone, a tablet computer, a laptop computer, a portable digital assistant device, a portable game console, and/or other such devices. The client devices 205a, 205b, and 205c may also be implemented in computing devices having other form factors, such as a desktop computer, vehicle onboard computing system, a kiosk, a point-of-sale system, a video game console, and/or other types of computing devices. While the example implementation illustrated in FIG. 2 includes three client devices, other implementations may include a different number of client devices that may utilize the content service provider 225 and/or the tab content service 210. Furthermore, in some implementations, the application functionality provided by the content service provider 225 may be implemented by a native application installed on the client devices 205a, 205b, and 205c, and the client devices 205a, 205b, and 205c may communicate directly with the tab content service 210 over a network connection.

In the example shown in FIG. 2, the tab content service 210 is shown as a cloud-based service that may be accessed over a network. However, other implementations of the tab content service 210 may be achieved by the content service provider 225 or by the client devices 205a, 205b, and 205c. In other implementations, the functionality of the tab content service 210 and/or the content service provider 225 described herein may be carried out on the client devices 205a, 205b, and 205c.

Figure 3A:
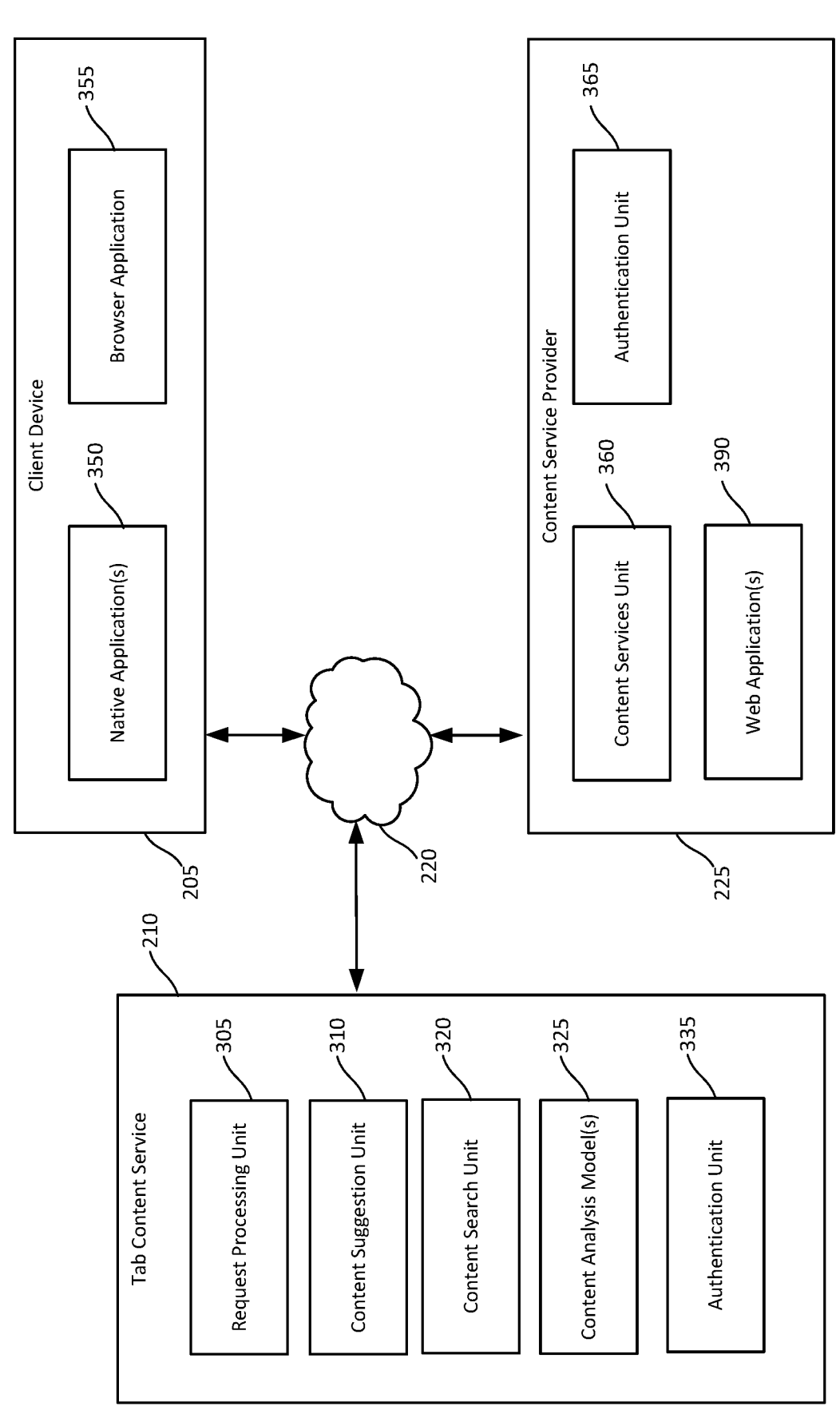
FIG. 3A is an example architecture that may be used, at least in part, to implement the client devices, the content service providers, and the tab content service shown in FIG. 2.

FIG. 3A is a diagram showing additional features of the tab content service 210, the client device 205, and the content service provider 225. In the example implementation shown in FIG. 3A, the tab content service 210 includes a request processing unit 305, a content suggestion unit 310, a content search unit 320, one or more content analysis models 325, and an authentication unit 335.

The request processing unit 305 is configured to receive requests from the client device 205 for content to be presented to the user in the tab menu 130 of the tabbed user interface 105. The browser application 355 or the native application 350 of the client device 205 sends a request for the content to the tab content service 210. The request includes content to be analyzed by the tab content service 210. The content to be analyzed is content that is displayed in the content pane 195 of an active tab of the tabbed user interface 105. In some implementations, the text or a portion of the text of the web page or other content that is displayed in the content pane 195 is provided with the request to the tab content service 210. In some implementations, a pointer or reference to the content, e.g., a URL of the content being displayed in the content pane 195 of the active tab of the tabbed user interface 105, is alternatively or additionally provided to the tab content service 210 for analysis. The request processing unit 305 provides the content received from the client device 205 to the content suggestion unit 310 for processing and receives a content suggestion from the content suggestion unit 310. The request processing unit 305 sends the content suggestion to the client device 205.

The content suggestion unit 310 is configured to receive the request for content from the request processing unit 305 and to analyze the request to identify content that may be displayed on the tab menu 130 of the tabbed user interface 105. In implementations in which the request includes a URL for the content being displayed in the content pane 195, the content suggestion unit 310 retrieves the web-based content referenced by the URL. The web-based content may include text and imagery. In other implementations, the content suggestion unit 310 receives at least a portion of the textual content from the content pane 195 of the active tab of the tabbed user interface 105. The content suggestion unit 310 is configured to provide textual content to one or more natural language processing (NLP) models of the content analysis models 325. The one or more NLP models are trained to analyze the textual content and to predict a subject matter of the textual content. The content suggestion unit 310 is also configured to provide any imagery associated with the request to one or more image analysis models that are configured to analyze the imagery and to predict a subject matter of the imagery. The content suggestion unit 310 is configured to provide the subject matter information obtained from the content analysis models 325 to the content search unit 320. The content search unit 320 is configured to search for content that is related to the subject matter. In some implementations, the content search unit 320 is configured to formulate a query to a search engine service external to the tab content service 210, and the search engine service provides search results relevant to the subject matter. The content suggestion unit 310 is configured to analyze the search results and extract content to be presented on the tab menu 130 from the search results.

In some implementations, the content suggestion unit 310 is configured to analyze the search results and to generate content from the search results. In a non-limiting example, the content suggestion unit 310 is configured to generate a summary of one or more of the search results and/or of the content received with the request. In some implementations, the summary may be generated by providing the search result or the content received with the request to an NLP model of the content analysis models 325, and the NLP model generates the summary from the text of the search result or content received with the request from the client device 205. In another non-limiting example, the content suggestion unit 310 generates content such as but not limited to pricing history and/or price comparisons for products or services, product comparisons, review information for products or services, suggestions for sources of related information, and/or other types of information that may be relevant based on the content being viewed in the tab of the tabbed user interface. The specific types of suggestions provided by the content suggestion unit 310 depends on the subject matter of the content received in the request from the client device 205.

In some implementations, the authentication unit 335 provides functionality for verifying whether users are permitted to access the services and/or documents provided by the tab content service 210. The authentication unit 335 provides functionality for receiving authentication credentials for the users from their respective client device 205. The authentication unit 335 is configured to verify that the authentication credentials are valid and permit the users to access the services provided by the tab content service 110 and/or the tab content service 210 responsive to the authentication credentials being valid.

The content service provider 225 includes a content services unit 360 and/or an authentication unit 365. In some implementations, the content services unit 360 is configured to provide functionality for users to consume, create, share, collaborate on, and/or modify various types of electronic content. The content services unit 360 provides a web-based interface to enable users to access at least a portion of the services provided by the content service provider 225. In other implementations, users may access the services provided by the content service provider 225 via one or more native applications 350.

In some implementations, the authentication unit 365 provides functionality for verifying whether users are permitted to access the services and/or documents provided by the content service provider 225 and/or the tab content service 210. The authentication unit 365 provides functionality for receiving authentication credentials for the users from their respective client device 205. The authentication unit 365 is configured to verify that the authentication credentials are valid and permit the users to access the services and/or documents provided by the content service provider 225 and/or the tab content service 210 responsive to the authentication credentials being valid.

The client device 205 may include one or more web-enabled native applications 350 and/or a browser application 355. The one or more native applications 350 include an application developed for use on the client device 205 and/or an application that communicates with the content service provider 225 to enable users to consume, create, share, collaborate on, and/or modify electronic content. The browser application 355 may be an application for accessing and viewing web-based content. The content service providers 225a and 225b may provide a web application that enables users to consume, create, share, collaborate on, and/or modify content. A user of the client device 205 may access the web application and render a user interface for interacting with the content service providers 225a and 225b in the browser application 355. The content service providers 225a and 225b and/or the tab content service 210 may support both the one or more web-enabled native applications 350 and one or more web applications 390, and the users may choose which approach best suits their needs. The tab content service 210 may also provide support for the one or more native applications 350, the browser application 355, or both to provide functionality for a user of the client device 205 to obtain the services provided by the tab content service 210.

Figure 3B:
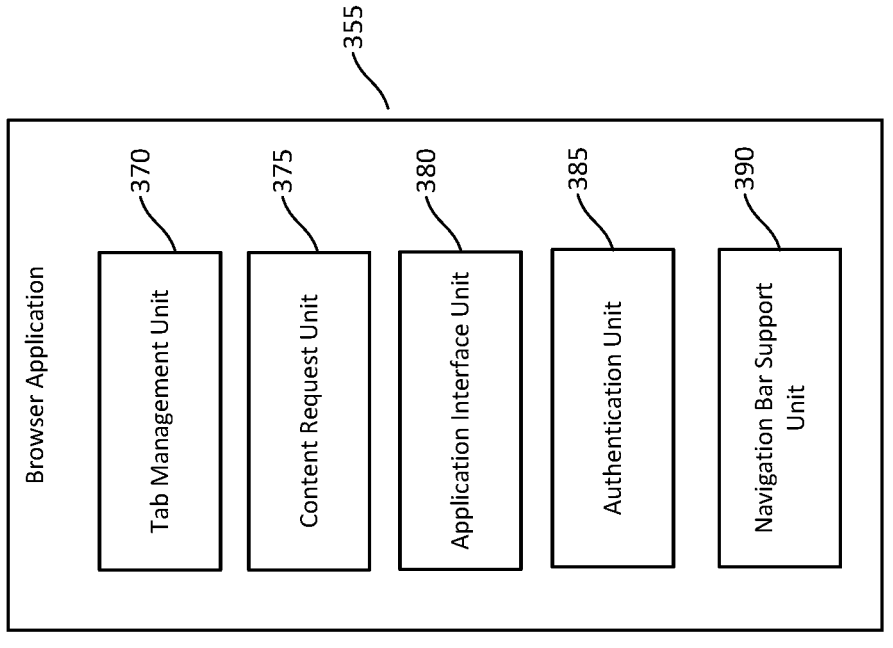
FIG. 3B is an example implementation of the browser application shown in the preceding examples.
Figure 4A:
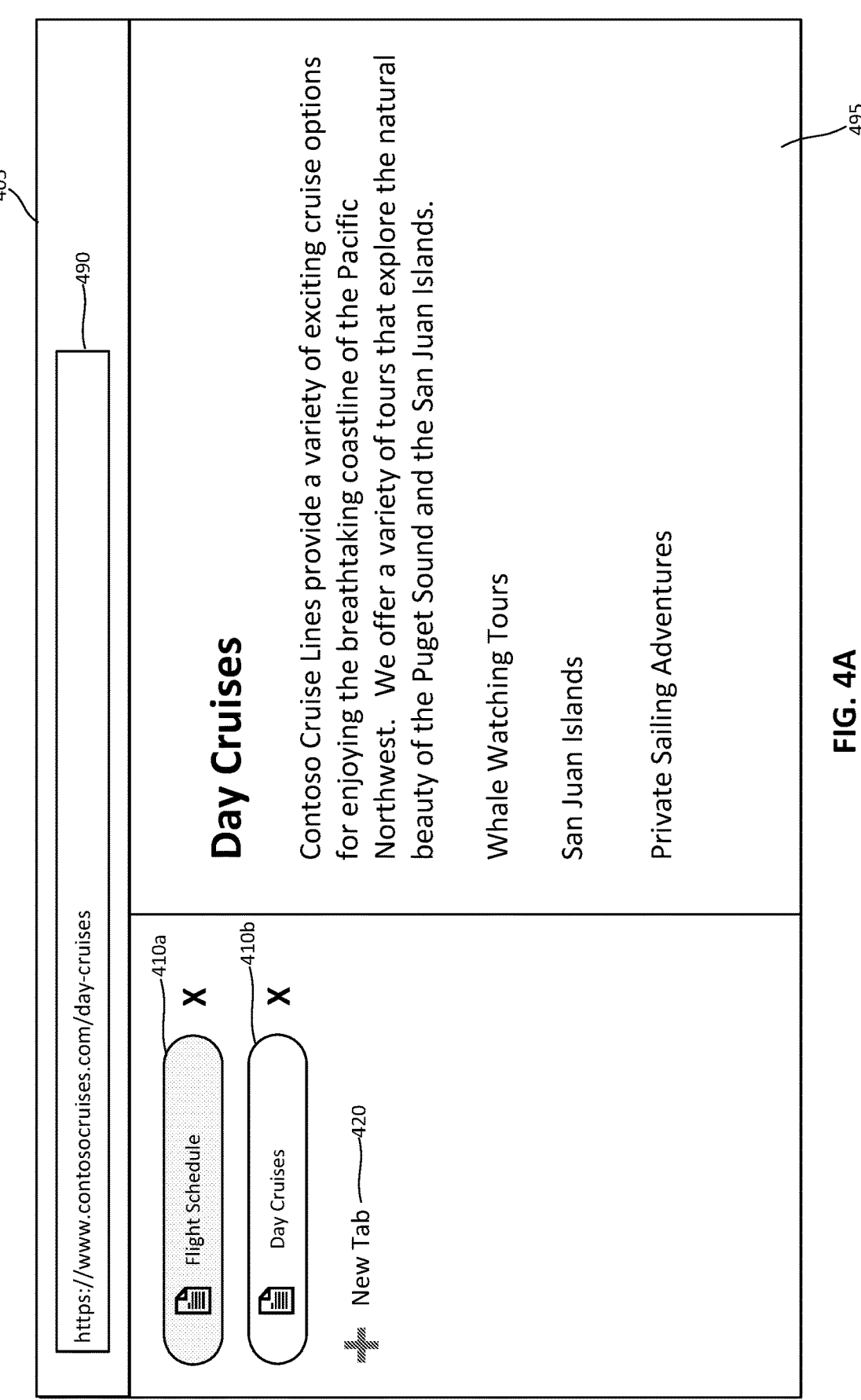
FIGS. 4A, 4B, 4C, 4D, 4E, 4F, and 4G are diagrams showing additional example user interfaces according to the techniques described herein.
Figure 4B:
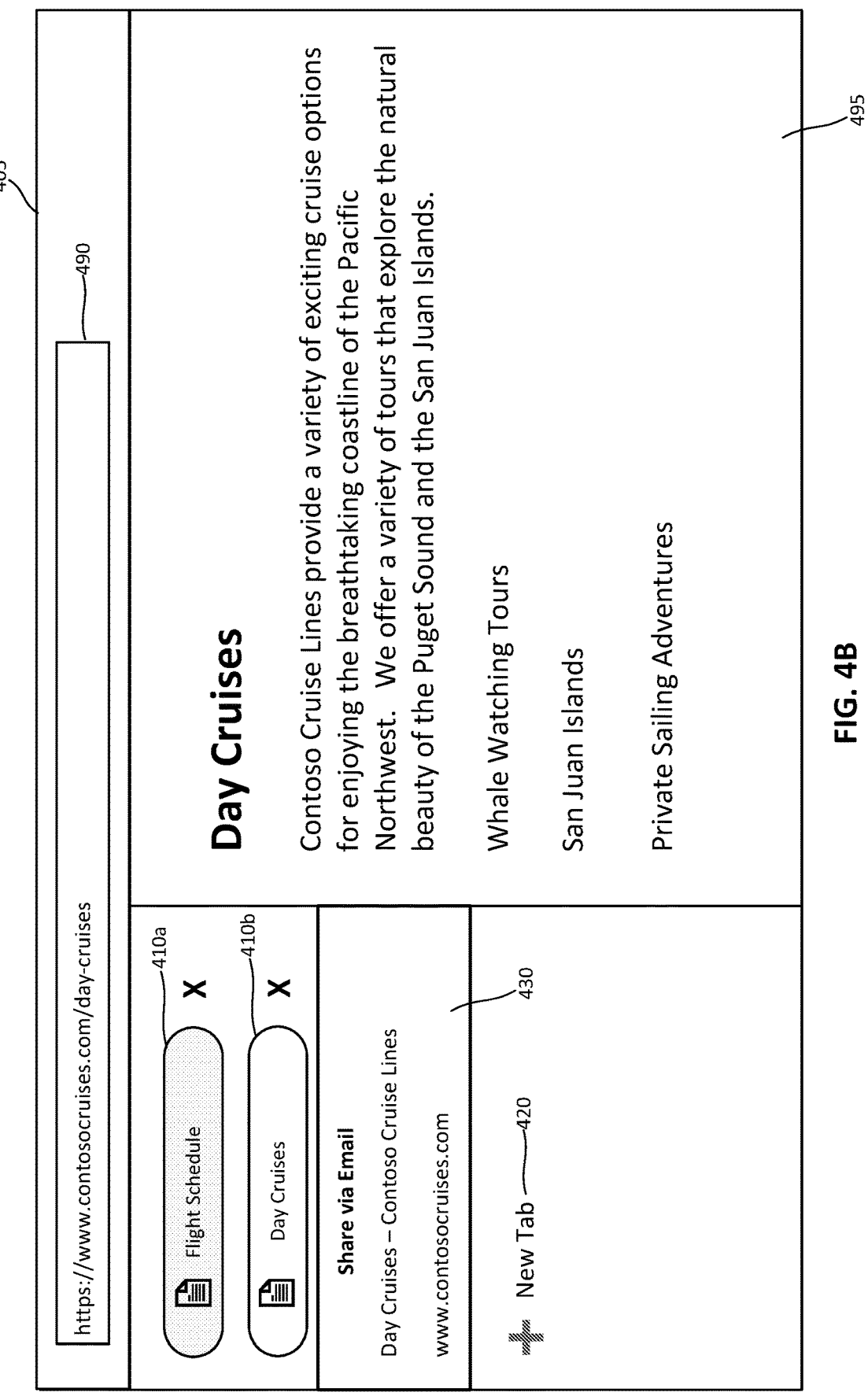
Figure 4C:
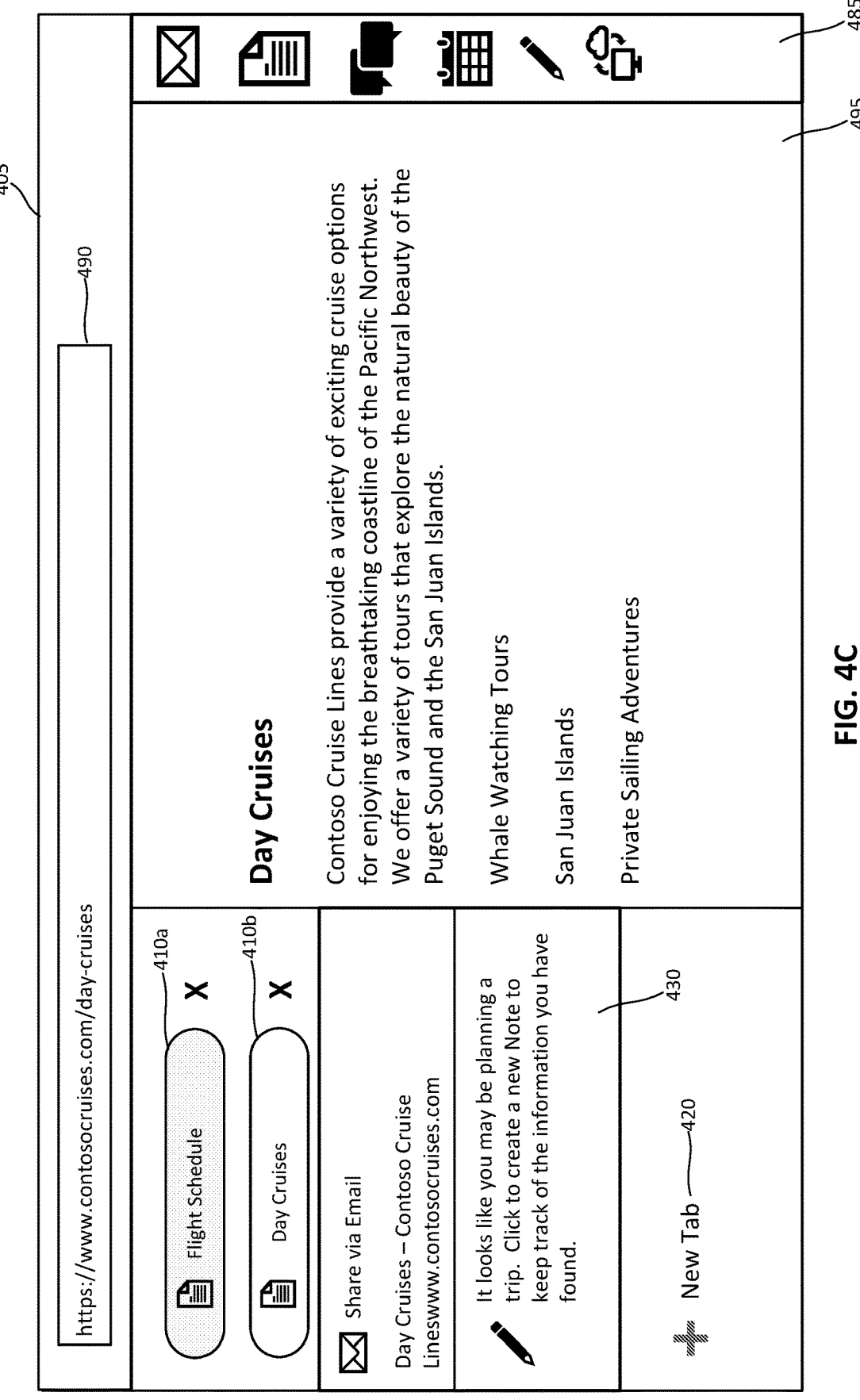
Figure 4D:
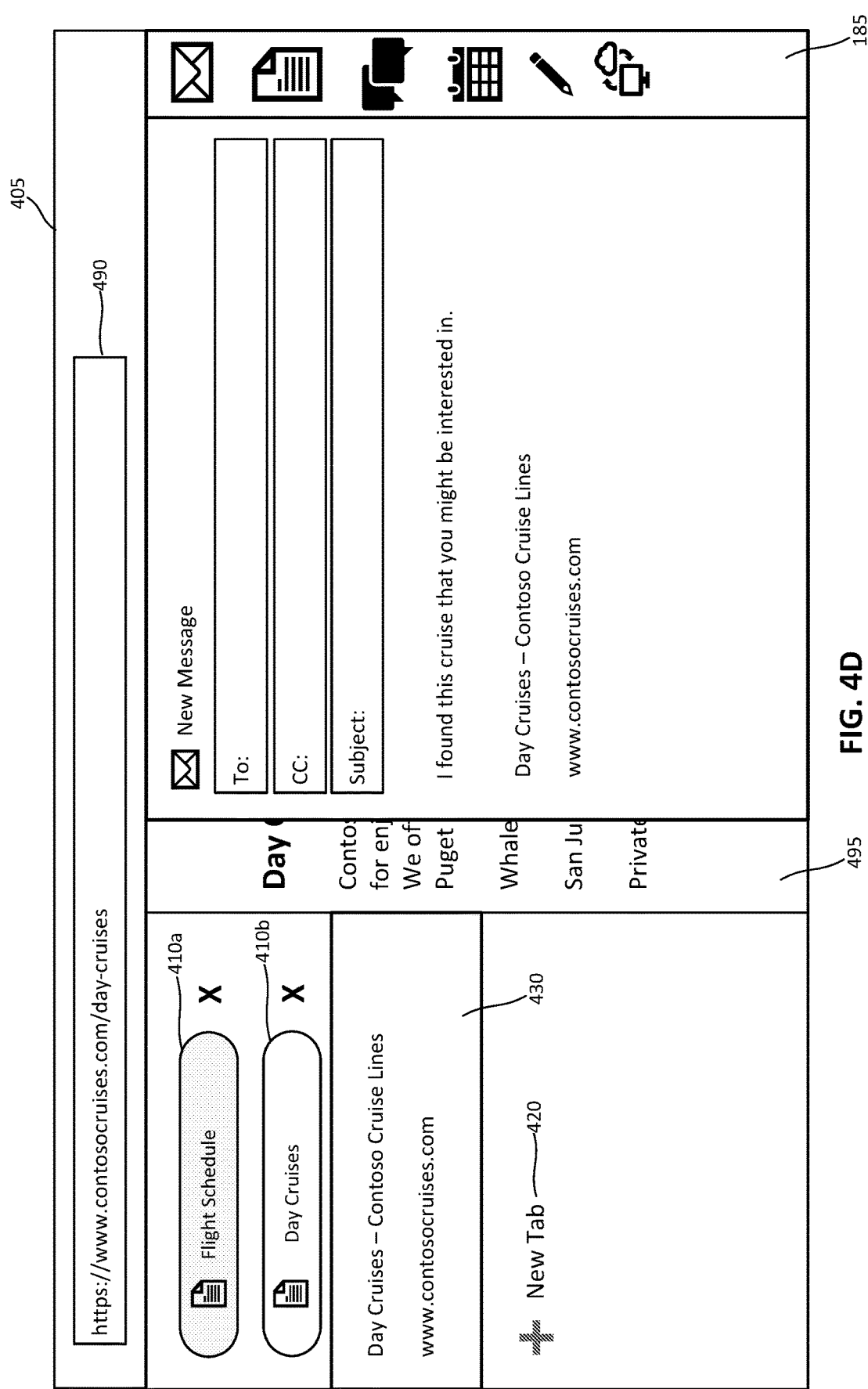
Figure 4E:
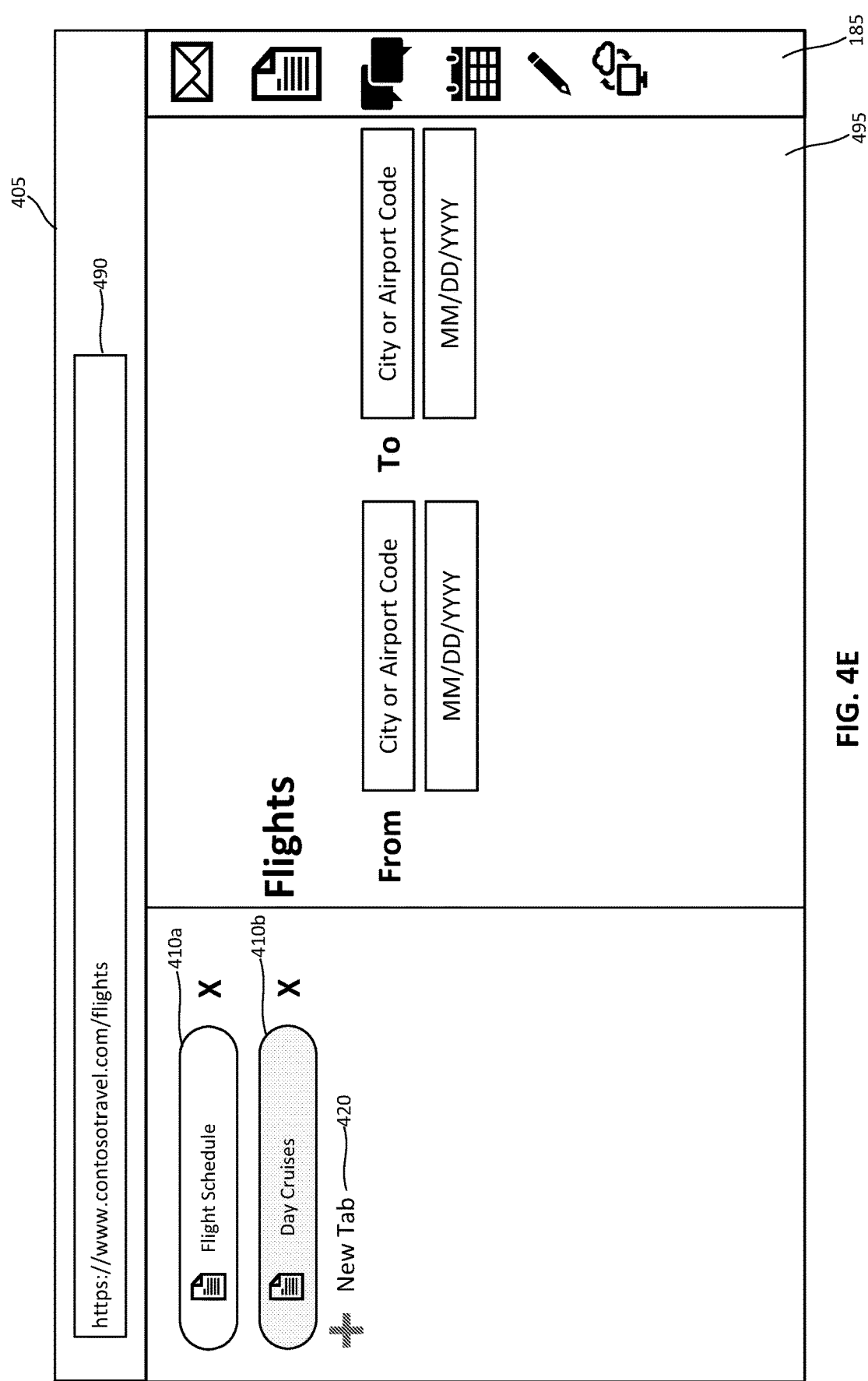
Figure 4F:
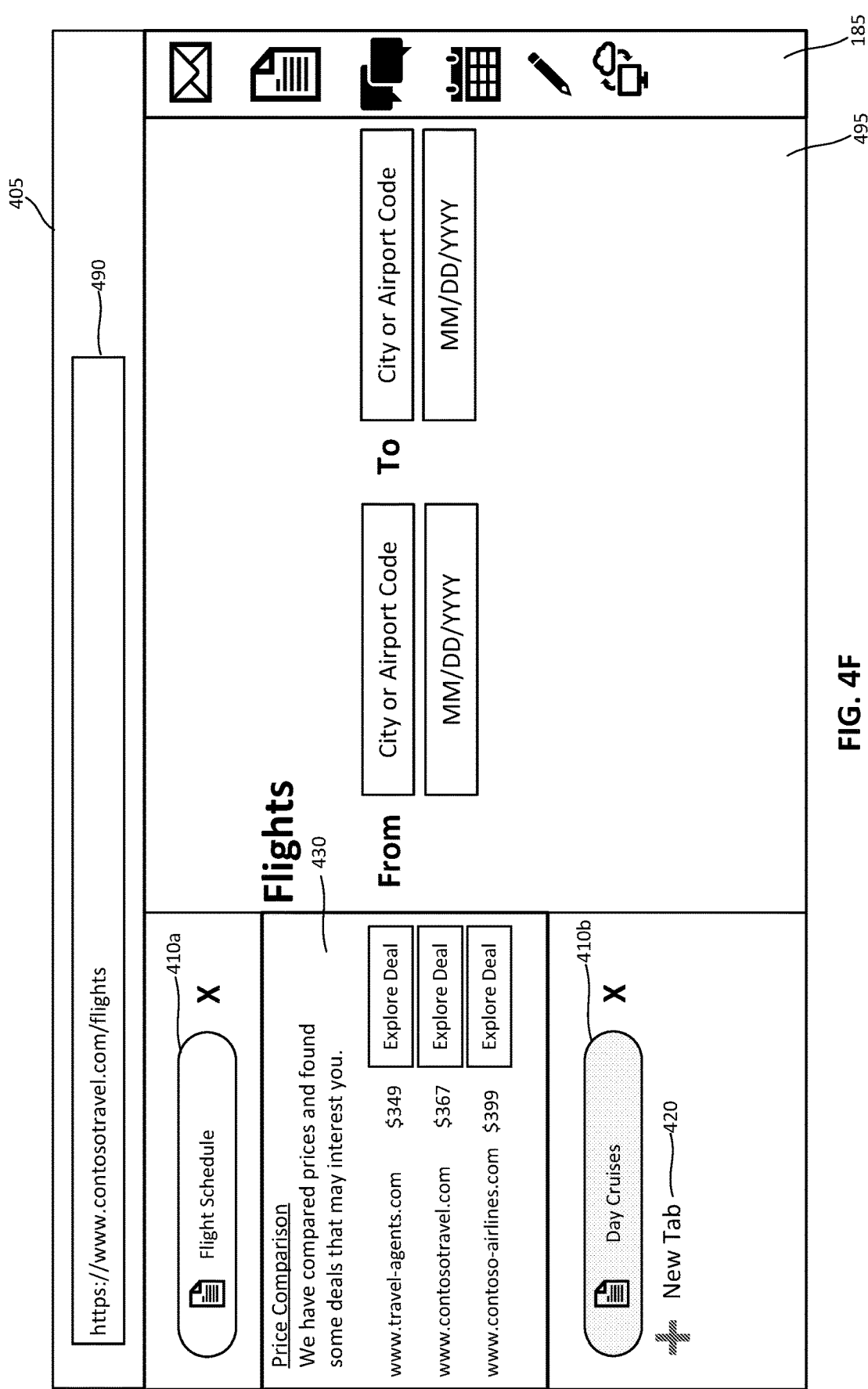
Figure 4G:
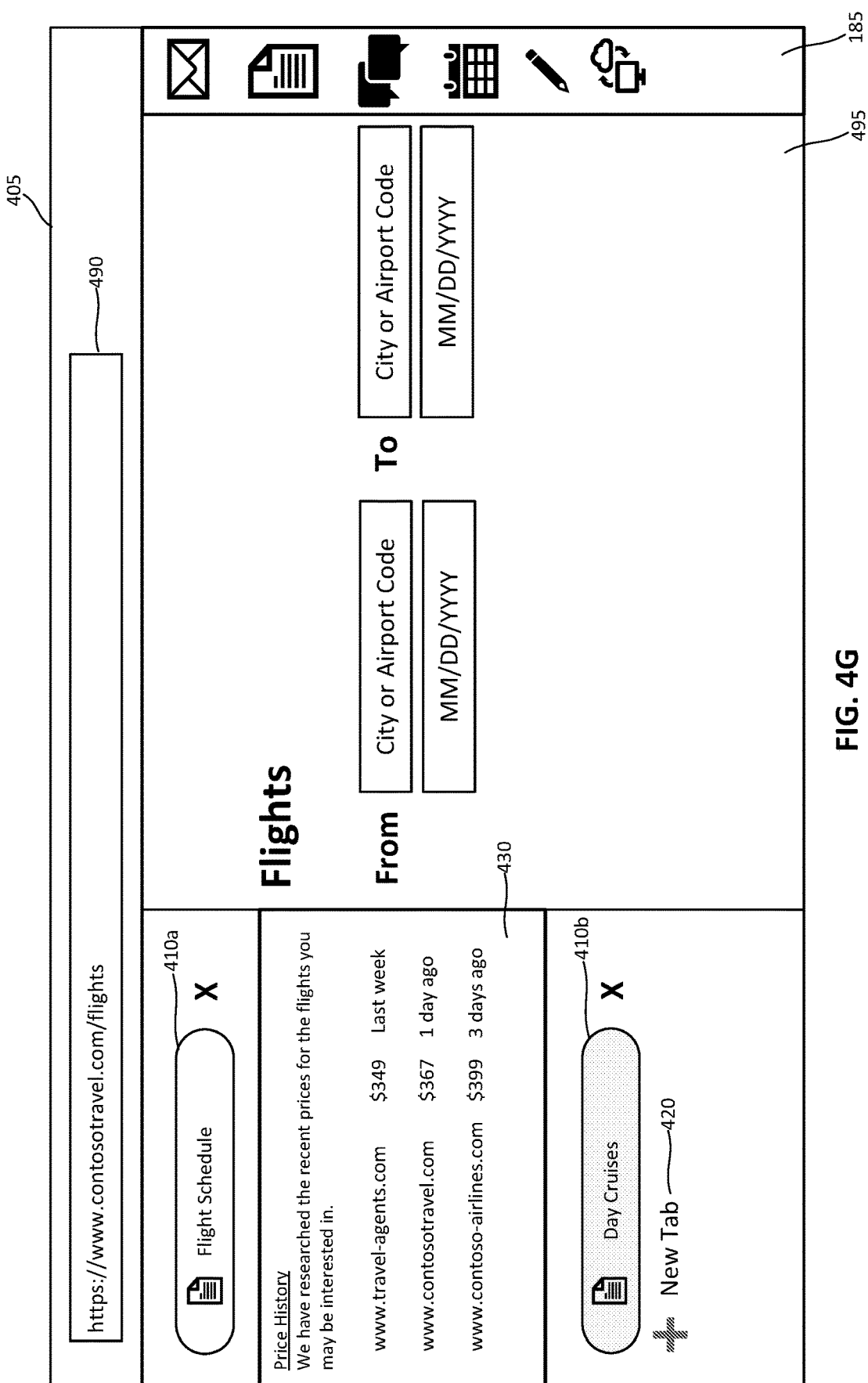

FIG. 3B is a diagram that shows an example implementation of the browser application 355 of the client device 205. In some implementations, the browser application 355 includes a tab management unit 370, a content request unit 375, an application interface unit 380, an authentication unit 385, and a navigation bar support unit 390. The native application 350 may also implement similar elements as those shown in FIG. 3B. The browser application 355 implements the tabbed user interface 105 shown in FIGS. 1A-1G and/or the alternative tabbed user interface 405 shown in FIGS. 4A-4G.

The content request unit 375 is configured to send a request for content to the tab content service 210. The request includes content to be analyzed by the tab content service 210 in some implementations. The content to be analyzed may include all or a portion of the content shown in the content pane 195 of an active tab of the tabbed user interface 105 or the tabbed user interface 405. In some implementations, the content request unit 375 provides a pointer or reference to the content, e.g., a URL of the content being displayed in the content pane 195 of the active tab of the tabbed user interface 105, alternatively or additionally to the content of the content pane 195. The content request unit 375 sends the request to the tab content service 210 in response to an indication from the tab management service 370 that content for a tab menu is required. The content request unit 375 receives a content suggestion from the tab content service 210 and provides the content suggestion to the tab management unit 370 for formatting and presentation on the tab menu.

The tab management unit 370 is configured to detect that the user has clicked on or otherwise interacted with a tab of the tabbed user interface 105 or tabbed user interface 405 shown in the preceding and subsequent examples. In response to the user clicking on or otherwise actuating a tab of the tabbed user interface, the tab management unit 370 causes the tab menu 130 to be displayed on the user interface 105 or the tab menu 430 to be displayed on the user interface 405. The tab management unit 370 also causes the content request unit 375 to obtain content from the tab content service 210 to be presented in the tab menu 130 or the tab menu 430 in some implementations. The tab management unit 370 is configured to combine the content received from the content request unit 375 with application-specific information to generate the menu items for the tab menu 130 or the tab menu 430. As discussed in the preceding examples, the content suggestions obtained by the content request unit 375 are informational in some implementations but may include links to other content relevant to the content being displayed in the content pane 195 or the content pane 495.

The tab management unit 370 creates context-specific menu items that include controls for performing actions on an application to which the user has access from the browser application 355 in some implementations. The user may have access to one or more applications that can be accessed via the tabbed user interface. In other implementations, the tab management unit 370 can include controls for performing actions on and application or applications that are installed on or accessible from the computing device. These applications may not be directly accessed from the tabbed user interface but may instead launch in a separate application window on the computing device. In some implementations, these applications are available via the navigation bar 185, and the user may click on or otherwise activate one of these icons to launch the application associated with the icon in an application pane 180, such as that shown in FIG. 1D, or in a new tab. The tab management unit 370 considers the typical usage patterns of the user and/or other users when determining the context in some implementations. If the user typically accesses certain applications more frequently than others, the menu items presented to the user by the tab management unit 370 are tailored toward the applications more commonly used by the user. Furthermore, if the user typically performs certain actions when viewing certain types of content in the content pane 195 of the active tab, the tab management unit may include menu items in the tab menu 130 that enable the user to quickly perform these actions without having to navigate away from the active tab. Other usage patterns may be considered when determining the context in other implementations. As discussed below, the navigation bar support unit 390 can store usage information in a persistent datastore associated with the browser 355 on the client device 205 related to the applications that the user launches from the navigation bar. The applications may also update the user information to create a history of the types of actions performed in each application and the type of content on which these actions were taken. Other types of information may also be captured to establish the typical usage patterns of the user in other implementations.

In some implementations, the tab management unit 370 accesses a mapping between the types of applications available to the user in the browser application 355 and templates for menu items that may be generated by the tab management unit 370 for the application. In some implementations, the templates may include an icon associated with the application, a section for inserting textual and/or image content derived from the content obtained by the content request unit 375, a control which may be activated to cause the application to perform an action or actions on the content obtained by the content request unit 375, and a short summary of the actions to be taken by the application if the menu item is selected to be displayed with the menu tab. In a non-limiting example, an email application is associated with a menu item template that includes an icon for the email application, a control which when activated causes the email application to be opened within the tabbed user interface 105 or 405 and insert the textual and/or image content derived from the content obtained by the content request unit 375 into a body of the email message. In another non-limiting example, a calendar application is associated with a calendar menu item template that includes an icon for the calendar application, a control which when activated causes the calendar application to be opened within the tabbed user interface 105 or 405 and insert the textual and/or image content derived from the content obtained by the content request unit 375 into a body of the calendar event. Templates for other applications are provided in some implementations. The templates may be stored in a persistent memory of the client device 205 that is accessible by the browser application 355. The browser application 355 is configured to obtain the templates and/or updates to the templates from the tab content service 210 or another content server associated with the browser application 355. In some implementations, the tab management unit 370 includes a tab menu item for each application to which the user has access. In other implementations, the tab management unit 370 selects a subset of the applications for which to provide a tab menu item. For example, the tab management unit 370 selects a subset of the applications most frequently used by the user. The navigation bar support unit 390 may track which applications are activated by the user from the navigation bar 190 or otherwise used in their native form.

As discussed in the preceding examples, the tab management unit 370 provides informational menu items in some implementations, such as those shown in FIGS. 1F and 1G. The tab content service 210 can provide the tab management unit 370 with substantially real-time information. For example, referring back to the price comparison and price history examples shown in FIGS. 1F and 1G, tab content service 210 generates the price comparison and price history information and provides this information to the browser application 355 of the client device 205. In some implementations, the tab content service 210 provides this information formatted in a layout that can be presented in a menu item of the tab menu 130. The price history and price comparison examples are examples of type of informational menu items that may be provided by the tab content service 210. Other types of informational content may also be created by the tab content service 210 based on the subject matter of the content being viewed in an active tab of the tabbed user interface 105 or 405.

In other implementations, the tab content service 210 provides the information to the browser application 355 of the client device, and the tab management unit 370 formats the information for presentation as a menu item of the tab menu 130. However, in some implementations, the tab content service 210 implements the formatting using templates that indicate how specific types of information provided by the tab content service 210 should be laid out in the menu item of the tab menu 130. In some implementations, the content service 210 may use a markup language to tag information included in the information provided to the browser 355. Referring back to the price history example, the information provided by the content service 110 may tag flight information with a flight information tag, a price tag associated with the price of the flight, and a date tag associated with a date the price was applicable. The templates may associate these tags with particular locations in a layout of the menu item when generating the menu item. In some implementations, the tab content service 210 includes a content type identifier in the content provided to the browser 355, and the tab content service 210 maps this content type identifier to the appropriate template. The mapping between the content type identifiers may be stored in a persistent memory associated with the browser application 355 and may be updated periodically by the content service 210 as new content type identifiers and templates are added.

The content request unit 375 is configured to send a request to the tab content service 210 to obtain content to be presented in the tab menu 130. The request includes content to be analyzed by the tab content service 210. The content to be analyzed is content that is shown in the content pane 195 of an active tab of the tabbed user interface 105. In some implementations, the text or a portion of the text of the web page or other content that is shown in the content pane 195 is provided with the request to the tab content service 210. In some implementations, the content request unit 375 includes a URL of the content being shown in the content pane 195 of the active tab of the tabbed user interface 105. The tab content service 210 provides a content suggestion in response to the request as discussed in the preceding examples. The content request unit 375 provides the content suggestion to the tab management unit 370 for display on the tabbed user interface 105.

The application interface unit 380 is configured to determine which applications that a user has access to from the browser application 355. In some implementations, the application interface unit 380 is configured to obtain the application information from the navigation bar support unit 390. The application interface unit 380 obtains a list of the applications that are available to the user via the browser application 355 from the navigation bar support unit 390. The application interface unit 380 obtains the application information for implementations in which the menu items presented on the tab menu 130 are at least in part context specific.

The navigation bar support unit 390 is configured to support the navigation bar 185 of the user interface 105 shown in the preceding examples. The navigation bar support unit 390 is configured to access the user profile information for a user of the client device 205 that indicates which application icons to include on the navigation bar 185. The navigation bar support unit 390 facilitates displaying of the navigation bar 185 on the tabbed user interface 105. In some implementations, the navigation bar support unit 390 provides a user interface that permits the user to configure which applications are presented on the navigation bar 190. The user profile information is stored in a persistent memory of the computing device 205 of the user. In some implementations, the browser application 355 is configured to back up the user profile information to a server (not shown) which is configured to store the user profile information. The navigation bar support unit 390 is configured to use the server to store the user profile information for both backup and dissemination to multiple client devices 205 in instances in which the user has multiple client devices to permit the user profile to be shared across the client devices.

In some implementations, the authentication unit 385 provides functionality for verifying whether users are permitted to access the services provided by the content service provider 225 and/or the tab content service 210. The authentication unit 335 provides functionality for receiving authentication credentials for the users from their respective client device 205. In some implementations, the authentication unit 385 is configured to verify that the authentication credentials are valid and permit the users to access the services and/or documents provided by the content service provider 225 and/or the tab content service 210 responsive to the authentication credentials being valid. In some implementations, the user is authenticated by the content service provider 225 and the authentication unit 385 obtains an authentication token or other functionality for authenticating the user with the content service provider 225 and/or the tab content service 210.

FIGS. 4A, 4B, 4C, 4D, 4E, 4F, and 4G are examples of a vertical tabbed user interface 405 that may be implemented according to the techniques described herein. The tabbed user interface 405 may be supported in addition to or instead of the tabbed user interface 105 shown in the preceding examples. In some implementations of the browser application 355, the browser application 355 provides a user interface that enables the user to switch between the horizontal tabbed user interface 105 and the vertical user interface 405. The user interface 405 includes a content pane 495 similar to the content pane 195, an address bar 490 similar to the address bar 190, and a navigation bar 485 similar to the navigation bar 185 shown in FIGS. 1A-1G. The user interface 405 includes an add new tab control 420 that is similar to the add new tab control 120 shown in FIGS. 1A-1G.

FIG. 4A-4G shows a vertical rather than horizontal configuration for the tabs in which tabs 410a and 410b are aligned vertically along an edge of the user interface 405. Tabs 410a and 410b are similar to the tabs 110a and 110b shown in FIGS. 1A-1G. In the examples shown in FIGS. 4A-4G, the tab menu 430 is similar to the tab menu 130 shown in the preceding examples. However, the tab menu 430 is positioned below the tabs in the area to the left shown in FIGS. A-4G. In other implementations, the tab menu 430 may be placed positioned in other locations relative to the tab. In a non-limiting example, the tab menu 430 is displayed to the right of the tab associated with the tab menu.

FIG. 5A is an example flow chart of an example process 500 for providing a tabbed user interface that may be implemented by the browser application 355 or native application 350 of the client device 205. The process 500 may be implemented by the tab management unit 370 of the browser application 355 or the native application 350 in some implementations.

The process 500 includes an operation 505 of displaying a tabbed user interface comprising a plurality of tabs for navigating among a plurality of electronic content items. The tabbed user interface 105 or 405 is presented by the browser application 355 or native application 350 of the client device 205 to enable a user to access, create, and/or otherwise consume electronic content. The electronic content may be accessed via the content service providers 225a and/or 225b.

The process 500 includes an operation 510 of detecting a first user input indicating a first selection of a first tab of the plurality of tabs. The first tab is associated with a first electronic content item of the plurality of electronic content items. As shown in the preceding examples, the user may click on or otherwise select a tab of the plurality of tabs of the tabbed user interface.

The process 500 includes an operation 515 of obtaining first tab menu content for a first tab menu based on a first subject matter of the first electronic content item. The tab management unit 370 requests the content request unit 375 obtain content from the tab content service 210.

The process 500 includes an operation 520 of generating one or more first menu items based on the first tab menu content. The tab management unit 370 generates the menu items based on the tab menu content obtained by the tab content service 210.

The process 500 includes an operation 520 of causing the first tab menu to be displayed proximate to the first tab, the first tab menu including the one or more first menu items. As shown in the preceding examples, the tab menu 130 is displayed proximate to the tab that was selected by the user. The tab menu 130 includes the one or more first menu items that were generated for display on the tab menu 130.

FIG. 5B is an example flow chart of another example process 550 for providing a tabbed user interface that may be implemented by the browser application 355 or native application 350 of the client device 205. The process 500 may be implemented by the tab management unit 370 of the browser application 355 or the native application 350 in some implementations.

The process 550 includes an operation 555 of displaying a tabbed user interface in a browser application. The tabbed user interface comprising a plurality of tabs for navigating among a plurality of electronic content items. The tabbed user interface 105 or 405 is presented by the browser application 355 or native application 350 of the client device 205 to enable a user to access, create, and/or otherwise consume electronic content. The electronic content may be accessed via the content service providers 225a and/or 225b.

The process 550 includes an operation 555 of detecting a user input indicating a selection of a first tab of the plurality of tabs. The first tab is associated with a first electronic content item of the plurality of electronic content items. As shown in the preceding examples, the user may click on or otherwise select a tab of the plurality of tabs of the tabbed user interface.

The process 550 includes an operation 565 of obtaining content-based and context-based menu items for a tab menu. The menu content is based in part on textual content of the first electronic content item and on web-based applications available in the browser application. The tab management unit 370 generates the menu items based on the tab menu content obtained by the tab content service 210.

The process 550 includes an operation 570 of causing the tab menu to be displayed proximate to the first tab, the tab menu including the content-based and context-based menu items. As shown in the preceding examples, the tab menu 130 is displayed proximate to the tab that was selected by the user. The tab menu 130 includes the one or more menu items that were generated for display on the tab menu 130.

The detailed examples of systems, devices, and techniques described in connection with FIGS. 1A-5B are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1A-5 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 6:
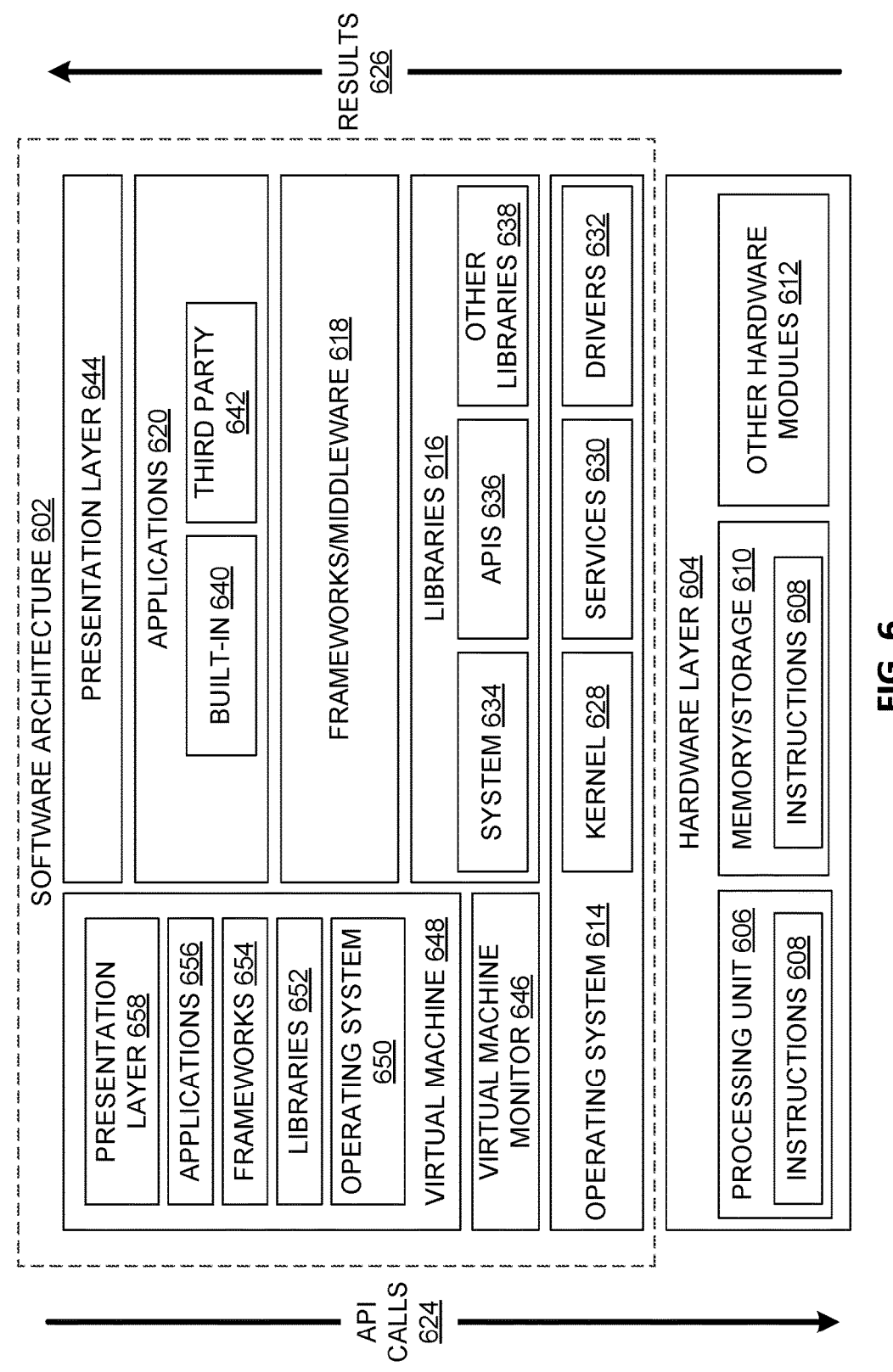
FIG. 6 is a block diagram showing an example software architecture, various portions of which may be used in conjunction with various hardware architectures herein described, which may implement any of the described features.

FIG. 6 is a block diagram 600 illustrating an example software architecture 602, various portions of which may be used in conjunction with various hardware architectures herein described, which may implement any of the above-described features. FIG. 6 is a non-limiting example of a software architecture, and it will be appreciated that many other architectures may be implemented to facilitate the functionality described herein. The software architecture 602 may execute on hardware such as a machine 700 of FIG. 7 that includes, among other things, processors 710, memory 730, and input/output (I/O) components 750. A representative hardware layer 604 is illustrated and can represent, for example, the machine 700 of FIG. 7. The representative hardware layer 604 includes a processing unit 606 and associated executable instructions 608. The executable instructions 608 represent executable instructions of the software architecture 602, including implementation of the methods, modules and so forth described herein. The hardware layer 604 also includes a memory/storage 610, which also includes the executable instructions 608 and accompanying data. The hardware layer 604 may also include other hardware modules 612. Instructions 608 held by processing unit 606 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks 618, applications 620, and a presentation layer 644. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks 618 may provide various graphic user interface (GUI) functions, high-level resource management, or high-level location services. The frameworks 618 may provide a broad spectrum of other APIs for applications 620 and/or other software modules.

The applications 620 include built-in applications 640 and/or third-party applications 642. Examples of built-in applications 640 may include, but are not limited to, a contacts application, a browser application, a location application, a media application, a messaging application, and/or a game application. Third-party applications 642 may include any applications developed by an entity other than the vendor of the particular platform. The applications 620 may use functions available via OS 614, libraries 616, frameworks 618, and presentation layer 644 to create user interfaces to interact with users.

Some software architectures use virtual machines, as illustrated by a virtual machine 648. The virtual machine 648 provides an execution environment where applications/modules can execute as if they were executing on a hardware machine (such as the machine 700 of FIG. 7, for example). The virtual machine 648 may be hosted by a host OS (for example, OS 614) or hypervisor, and may have a virtual machine monitor 646 which manages operation of the virtual machine 648 and interoperation with the host operating system. A software architecture, which may be different from software architecture 602 outside of the virtual machine, executes within the virtual machine 648 such as an OS 650, libraries 652, frameworks 654, applications 656, and/or a presentation layer 658.

Figure 7:
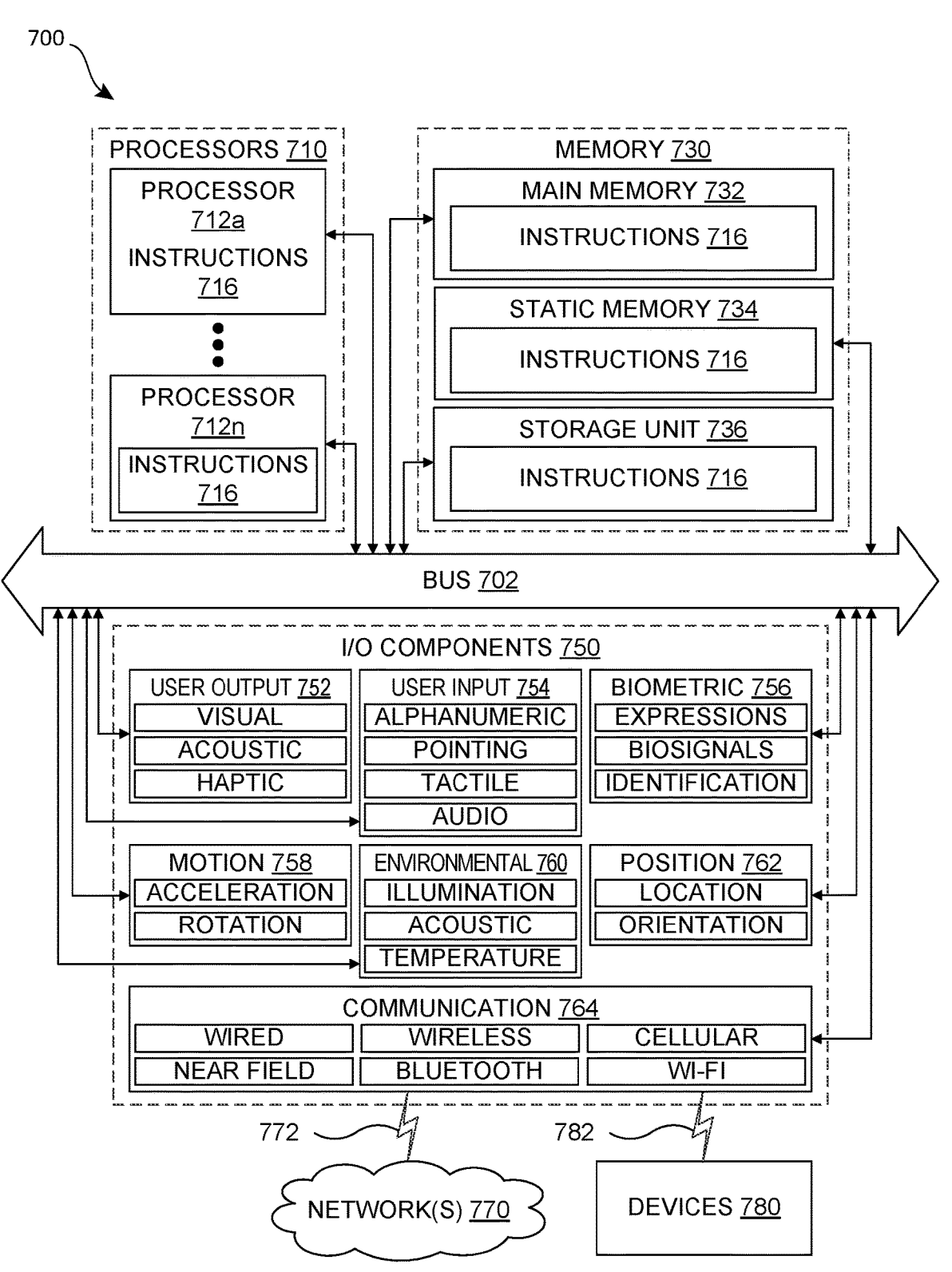
FIG. 7 is a block diagram showing components of an example machine configured to read instructions from a machine-readable medium and perform any of the features described herein.

FIG. 7 is a block diagram illustrating components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement modules or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 700 is illustrated, the term "machine" includes a collection of machines that individually or jointly execute the instructions 716.

The machine 700 may include processors 710, memory 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors $712a$ to $712n$ that may execute the instructions 716 and process data. In some examples, one or more processors 710 may execute instructions provided or identified by one or more other processors 710. The term "processor" includes a multi-core processor including cores that may execute instructions contemporaneously. Although FIG. 7 shows multiple processors, the machine 700 may include a single processor with a single core, a single processor with multiple cores (for example, a multi-core processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof. Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756, motion components 758, environmental components 760, and/or position components 762, among a wide array of other physical sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 758 may include, for example, acceleration sensors (for example, an accelerometer) and rotation sensors (for example, a gyroscope). The environmental components 760 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 762 may include, for example, location sensors (for example, a Global Position System (GPS) receiver), altitude sensors (for example, an air pressure sensor from which altitude may be derived), and/or orientation sensors (for example, magnetometers).

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 764 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 762, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
    a processor; and
    a machine-readable storage medium storing executable instructions that, when executed, cause the processor to perform operations of:
        displaying a tabbed user interface including a plurality of tabs for navigating among a plurality of electronic content items;
        detecting a first user input by a first user indicating a first selection of a first tab of the plurality of tabs, the first tab being associated with a first electronic content item of the plurality of electronic content items;
        obtaining first tab menu content for a first tab menu based on a first subject matter of the first electronic content item, wherein obtaining the first tab menu content includes:
            constructing a search query based on the first subject matter;
            providing the search query as an input to a search engine to obtain search results;
            analyzing the search results to extract a summary of the search results to include in the first tab menu content; and
            adding the summary of the search results to the first tab menu content;
        generating one or more first menu items based on the first tab menu content, the one or more first menu items being generated based on a type of content of the first electronic content item; and
        causing the first tab menu to be displayed at a position on the tabbed user interface based on a position of the first tab, the first tab menu including the one or more first menu items.

2. The data processing system of claim 1, wherein the machine-readable storage medium includes instructions configured to cause the processor to perform operations of:
    detecting a second user input indicating a second selection of a second tab of the plurality of tabs, the second tab being associated with a second electronic content item of the plurality of electronic content items;
    obtaining second tab menu content for a second tab menu based on a second subject matter of the second electronic content item;
    generating one or more second menu items based on the second tab menu content, wherein at least one of the one or more second menu items is different than the one or more first menu items; and
    causing the second tab menu to be displayed at a position on the tabbed user interface based on a position of the second tab, the second tab menu including the one or more second menu items.

3. The data processing system of claim 1, wherein obtaining the first tab menu content further comprises:
    sending a request to a server for the first tab menu content, the request including at least a portion of textual content of the first electronic content item, the server being configured to analyze the at least a portion of the textual content to determine the first subject matter of the first electronic content item and to obtain content related to the first subject matter of the first electronic content item; and
    receiving the first tab menu content from the server.

4. The data processing system of claim 1, wherein obtaining the first tab menu content further comprises:
    sending a request to a server for the first tab menu content, the request including Uniform Resource Locator (URL) of the first electronic content item, the server being configured to obtain an instance of the first electronic content item using the URL, to analyze the instance of the first electronic content item to determine the first subject matter of the first electronic content item, and to obtain content related to the first subject matter of the first electronic content item; and
    receiving the first tab menu content from the server.

5. The data processing system of claim 1, wherein generating the one or more first menu items based on the first tab menu content:

obtaining application information identifying one or more applications accessible from the tabbed user interface; and generating a first tab menu item associated with a first application of the one or more applications, the first tab menu item including a control, which when activated, causes a first application pane associated with the first application to be displayed in tabbed user interface and sends at least a portion of the first tab menu content to the first application pane.

6. The data processing system of claim 5, wherein a plurality of applications are accessible from the tabbed user interface, and wherein the machine-readable storage medium includes instructions configured to cause the processor to perform an operation of selecting the first application based on a frequency with which a user utilizes the first application compared to other applications of the plurality of applications.

7. The data processing system of claim 5, wherein generating a first tab menu item associated with a first application further comprises:

generating the first tab menu item using a template associated with the first application.

8. The data processing system of claim 5, wherein the machine-readable storage medium includes instructions configured to cause the processor to perform operations of:

detecting a second user input indicating a selection of the control of the first tab menu item;

causing an application pane associated with the first application to be displayed in the tabbed user interface in response to the second user input; and causing the first application to display at least a portion of the first tab menu content.

9. The data processing system of claim 1, wherein detecting the first user input indicating a selection of a first tab of the plurality of tabs further comprises:

detecting a pointer is positioned over the first tab without clicking on or otherwise interacting with the first tab.

10. The data processing system of claim 1, wherein detecting a user input indicating a selection of a first tab of the plurality of tabs further comprises receiving a first user input indicating that a first user has clicked on or touched the first tab.

11. A method implemented in a data processing system for providing a tabbed user interface, the method comprising:

displaying a tabbed user interface comprising a plurality of tabs for navigating among a plurality of electronic content items;

detecting a user input by a first user indicating a selection of a first tab of the plurality of tabs, the first tab being associated with a first electronic content item of the plurality of electronic content items;

obtaining tab menu content for a tab menu based on a subject matter of the first electronic content item, wherein obtaining the tab menu content includes:

constructing a search query based on the subject matter;

providing the search query as an input to a search engine to obtain search results;

analyzing the search results to extract a summary of the search results to include in the tab menu content; and adding the summary of the search results to the tab menu content;

generating one or more menu items based on the tab menu content, the one or more menu items being generated based on a type of content of the first electronic content item; and causing the tab menu to be displayed at a position on the tabbed user interface based on a position of the first tab, the tab menu including the one or more menu items.

12. The method of claim 11, wherein obtaining the tab menu content further comprises:

sending a request to a server for the tab menu content, the request including at least a portion of textual content of the first electronic content item, the server being configured to analyze the at least a portion of the textual content to determine the subject matter of the first electronic content item and to obtain content related to the subject matter of the first electronic content item; and receiving the tab menu content from the server.

13. The method of claim 11, wherein obtaining the tab menu content further comprises:

sending a request to a server for the tab menu content, the request including Uniform Resource Locator (URL) of the first electronic content item, the server being configured to obtain an instance of the first electronic content item using the URL, to analyze the instance of the first electronic content item to determine the subject matter of the first electronic content item, and to obtain content related to the subject matter of the first electronic content item; and receiving the tab menu content from the server.

14. The method of claim 11, wherein generating the one or more menu items based on the tab menu content:

obtaining application information identifying one or more applications accessible from the tabbed user interface; and generating a first tab menu item associated with a first application of the one or more applications, the first tab menu item including a control, which when activated, causes a first application pane associated with the first application to be displayed in tabbed user interface and sends at least a portion of the tab menu content to the first application pane.

15. A data processing system comprising:

a processor; and a machine-readable storage medium storing executable instructions that, when executed, cause the processor to perform operations comprising:

displaying a tabbed user interface in a browser application, the tabbed user interface comprising a plurality of tabs for navigating among a plurality of electronic content items;

detecting a first user input by a first user indicating a first selection of a first tab of the plurality of tabs, the first tab being associated with a first electronic content item of the plurality of electronic content items;

obtaining one or more first content-based and context-based menu items for a first tab menu, the one or more first content-based and context-based menu items being based in part on textual content of the first electronic content item and on web-based applications available in the browser application, the one or more first content-based and context-based menu items being obtained based on a type of content of the first electronic content item;

obtaining search results from a search engine in response to a search query based on the type of content of the first electronic content item;

analyzing the search results to extract a summary of the search results to include in the first tab menu;

adding the summary of the search results to the first tab menu; and causing the first tab menu to be displayed at a position on the tabbed user interface based on a position of the first tab, the first tab menu including the one or more first content-based and context-based menu items.

16. The data processing system of claim 15, wherein the machine-readable storage medium includes instructions configured to cause the processor to perform operations of:

detecting a second user input indicating a second selection of a second tab of the plurality of tabs, the second tab being associated with a second electronic content item of the plurality of electronic content items;

obtaining second content-based and context-based menu items for a second tab menu, the second content-based and context-based menu items being based in part on textual content of the second electronic content item and on the web-based applications available in the browser application; and causing the first tab menu to be displayed at a position on the tabbed user interface based on a position of the second tab, the second tab menu including the second content-based and context-based menu items.

17. The data processing system of claim 15, wherein obtaining the one or more first content-based and context-based menu items further comprises:

sending a request to a server for tab menu content, the request including at least a portion of textual content of the first electronic content item, the server being configured to analyze the at least a portion of the textual content to determine a subject matter of the first electronic content item and to obtain content related to the subject matter of the first electronic content item;

receiving the tab menu content from the server; and generating a first menu item of the one or more first content-based and context-based menu items based on the tab menu content from the server.

18. The data processing system of claim 16, wherein obtaining the one or more first content-based and context-based menu items further comprises:

sending a request to a server for tab menu content, the request including Uniform Resource Locator (URL) of the first electronic content item, the server being configured to obtain an instance of the first electronic content item using the URL, to analyze the instance of the first electronic content item to determine a subject matter of the first electronic content item, and to obtain content related to the subject matter of the first electronic content item;

receiving the tab menu content from the server; and generating a first menu item of the one or more first content-based and context-based menu items based on the tab menu content from the server.

19. The data processing system of claim 18, wherein obtaining one or more content-based and context-based menu items for the first tab menu further comprises:

generating a first tab menu item associated with a first application of the web-based applications, the first tab menu item including a control, which when activated, causes a first application pane associated with the first application to be displayed in tabbed user interface and sends at least a portion of the tab menu content to the first application pane.

20. The data processing system of claim 19, wherein a plurality of applications are accessible from the tabbed user interface, and wherein the machine-readable storage medium includes instructions configured to cause the processor to perform an operation of selecting the first application based on a frequency with which a user utilizes the first application compared to other applications of the plurality of applications.

* * * * *